United States Patent
Nonaka

[11] Patent Number: 5,589,911
[45] Date of Patent: Dec. 31, 1996

[54] AUTOFOCUSING APPARATUS FOR CAMERA HAVING MULTIPLE RANGING DEVICE

[75] Inventor: Osamu Nonaka, Sagamihara, Japan

[73] Assignee: Olympus Optical Co., Ltd., Tokyo, Japan

[21] Appl. No.: 570,364

[22] Filed: Dec. 11, 1995

Related U.S. Application Data

[63] Continuation of Ser. No. 162,340, Dec. 3, 1993, abandoned.

[30] Foreign Application Priority Data

| Dec. 9, 1992 | [JP] | Japan | 4-329481 |
| Jan. 8, 1993 | [JP] | Japan | 5-1542 |
| Mar. 2, 1993 | [JP] | Japan | 5-41510 |

[51] Int. Cl.$^6$ .............................. G03B 3/00; G03B 13/18
[52] U.S. Cl. ................................... 396/80; 396/121
[58] Field of Search .................. 354/403, 195.1, 354/195.12; 356/3

[56] References Cited

U.S. PATENT DOCUMENTS

| 4,470,681 | 9/1984 | Johnson | 354/403 |
| 4,748,469 | 5/1988 | Tamura | 354/403 |
| 5,051,766 | 9/1991 | Nonaka et al. | 354/403 X |
| 5,283,894 | 2/1994 | Deran | 395/600 |
| 5,313,245 | 5/1994 | Konishi | 354/403 X |
| 5,448,727 | 9/1995 | Annevelink | 395/600 |
| 5,534,991 | 7/1996 | Maeda et al. | 354/403 X |

*Primary Examiner*—Howard B. Blankenship
*Attorney, Agent, or Firm*—Frishauf, Holtz, Goodman, Langer & Chick

[57] ABSTRACT

In an aspect, an output from a central ranging section is supplied to a comparator, a nearest point determining section, and a selecting section, whereas outputs from a peripheral ranging section are supplied to the determining section and the selecting section. The first and second predetermined values are input to the comparator and the selecting section. A gate circuit receives the determination result from the nearest point determining section and the comparison result from the comparator via an inverter. Another gate circuit receives the outputs from the comparator and the selecting section. A focus control section controls a focusing lens according to the outputs from the gate circuits. In another aspect, an output from a central ranging section is supplied to a nearest point selecting section, a standard deviation calculating section, and a gate circuit, whereas outputs from a peripheral ranging section are supplied to the selecting and calculating sections. A comparator receives the calculation result from the calculating section and a predetermined value. Another gate circuit receives the outputs from the selecting and calculating sections. An output from the gate circuits which is selected by the comparator is supplied to a focus control section, so as to control a focusing lens.

32 Claims, 22 Drawing Sheets

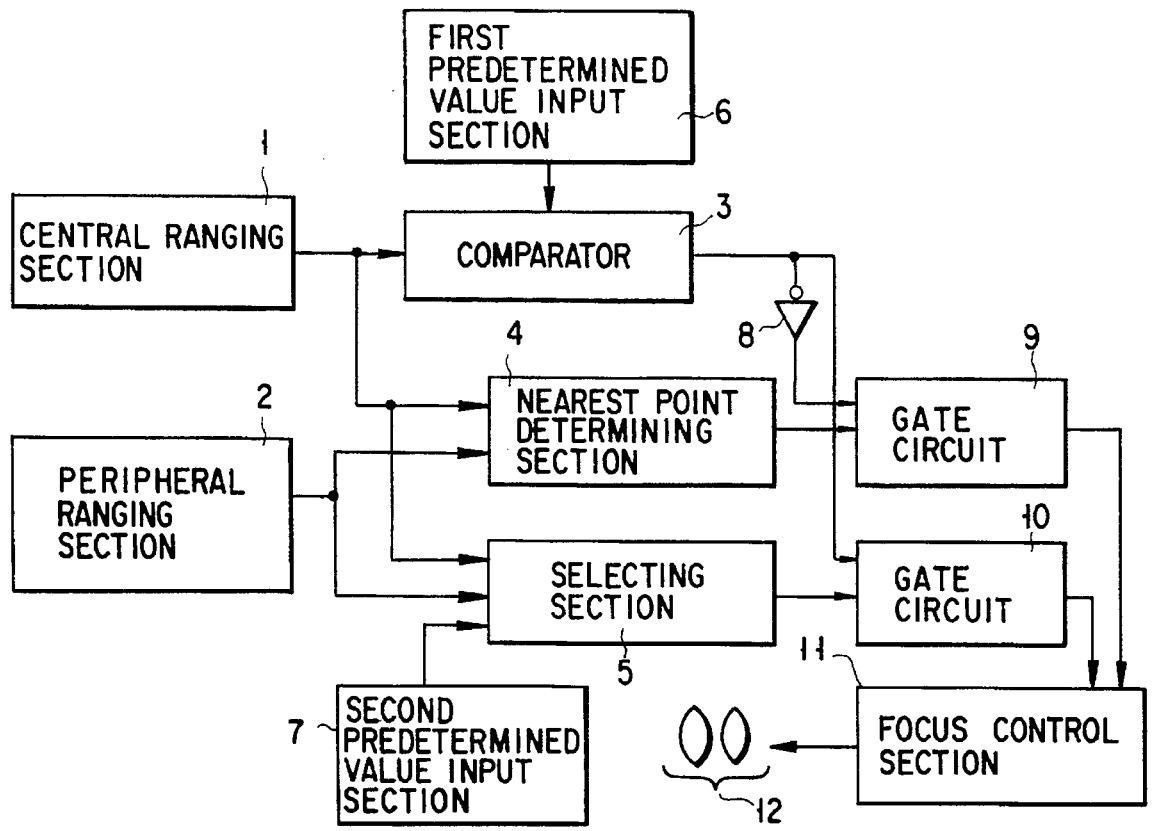
F I G. 1
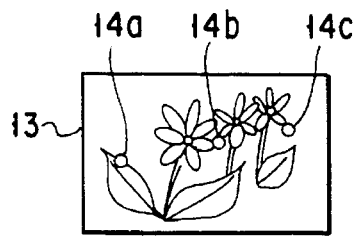
F I G. 2A
14a = 0.6 m
14a = 0.8 m
14a = 1 m
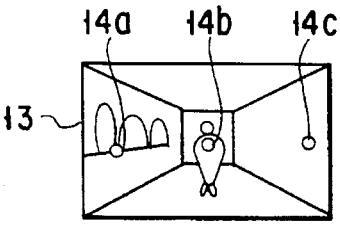
F I G. 2B
14a = 1.5 m
14b = 3 m
14c = 1.5 m
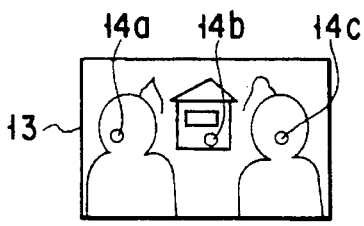
F I G. 2C
14a = 1.5 m
14b = 20 m
14c = 1.5 m

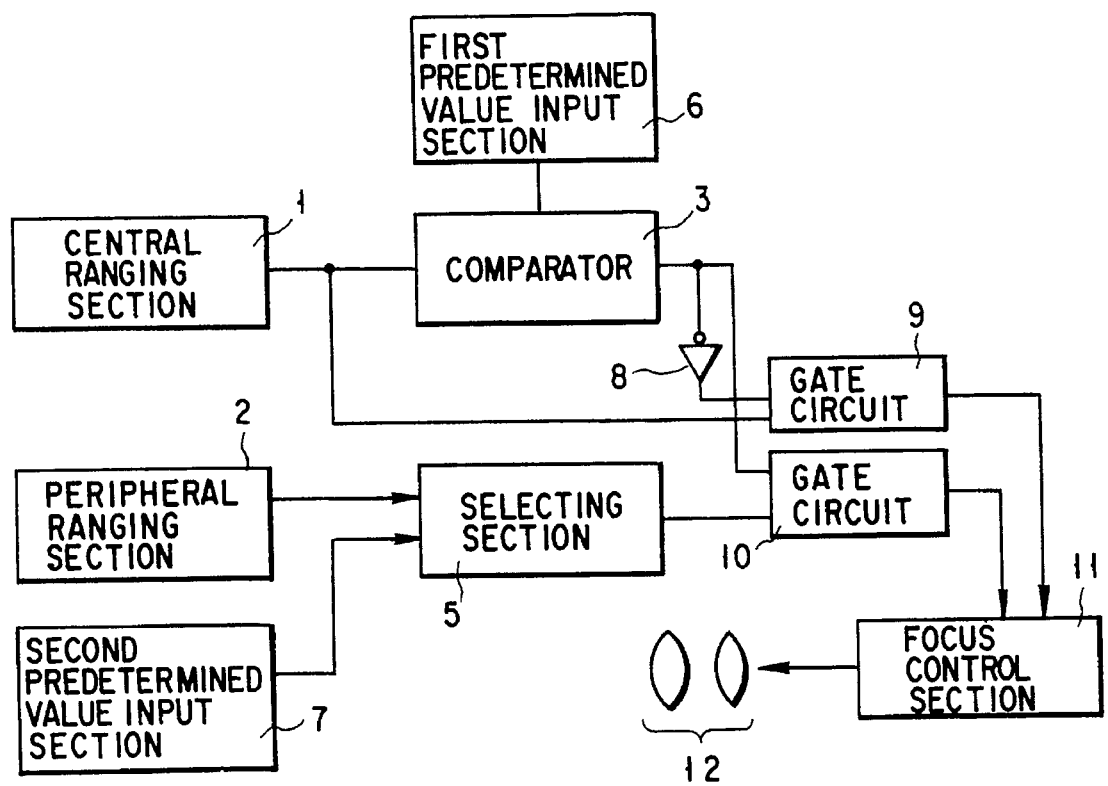
F I G. 16
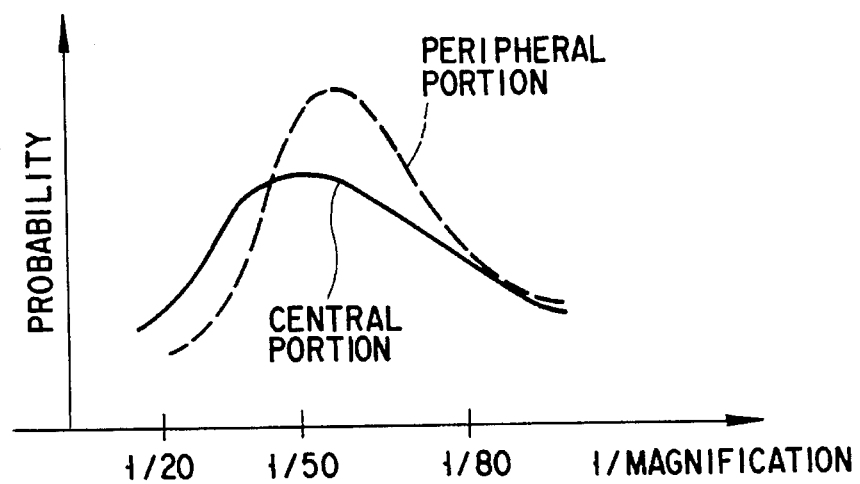
F I G. 17

14a = 2 m
14b = 3 m
14c = 1 m

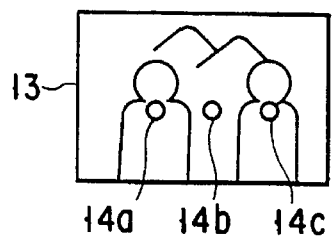
FIG. 25A
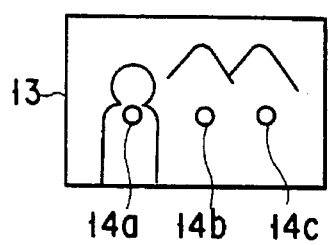
FIG. 25B
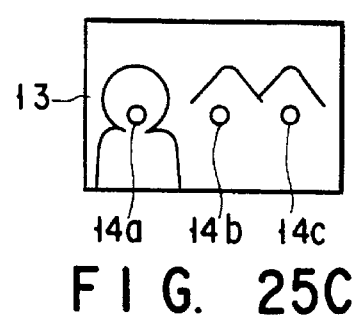
FIG. 25C
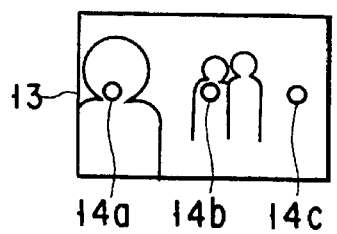
FIG. 25D
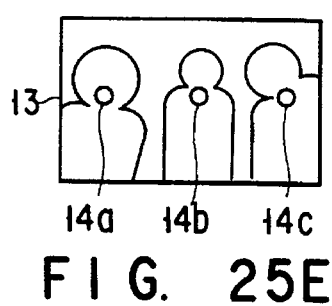
FIG. 25E
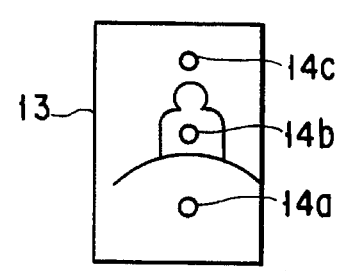
FIG. 25F
|  | A | | | B | | | C | | |
|---|---|---|---|---|---|---|---|---|---|
| LONG DISTANCE |  | ○ |  |  | ○ | ○ |  | ○ | ○ |
| MIDDLE DISTANCE | ○ |  |  | ○ | ○ |  |  |  |  |
| SHOT DISTANCE |  |  |  |  |  |  |  | ○ |  |
|  | D | | | E | | | F | | |
|---|---|---|---|---|---|---|---|---|---|
| LONG DISTANCE |  |  | ○ |  |  |  |  |  | ○ |
| MIDDLE DISTANCE |  | ○ |  |  | ○ |  |  | ○ |  |
| SHOT DISTANCE | ○ |  |  | ○ |  |  | ○ | ○ |  |
FIG. 26

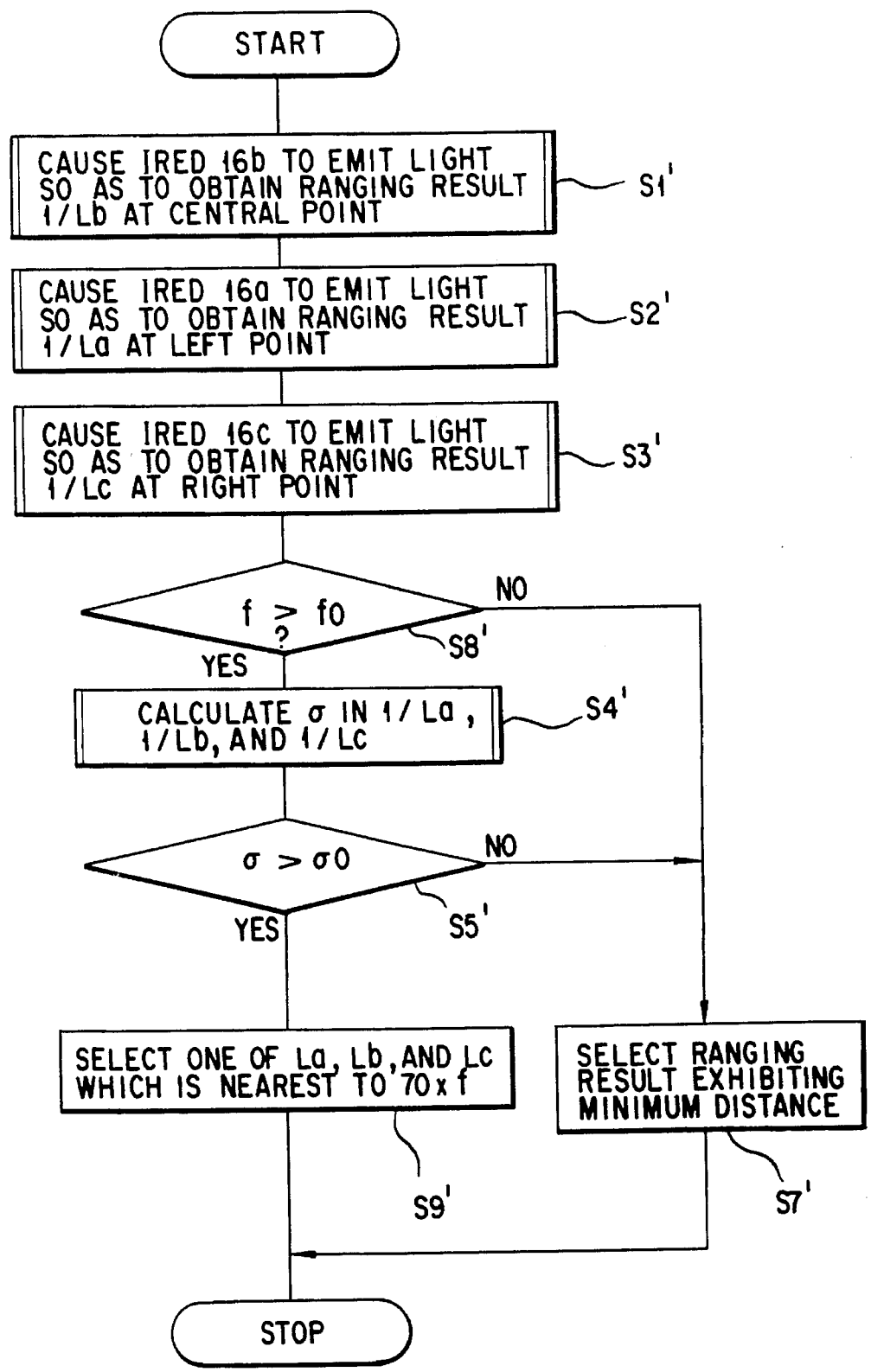
F I G. 31

2

AUTOFOCUSING APPARATUS FOR CAMERA HAVING MULTIPLE RANGING DEVICE

This application is a continuation of application Ser. No. 08/162,340, filed Dec. 3, 1993, now abandoned.

BACKGROUND OF THE INVENTION

1. Field of the Invention

The present invention relates to an autofocusing apparatus for a camera having a multiple ranging device and, more particularly, to an autofocusing apparatus for a camera having a multiple ranging device capable of ranging a plurality of points within a photographic frame.

2. Description of the Related Art

All conventional cameras have been designed to perform a ranging operation for focusing at only one point on a central portion of a photographic frame. With such a camera, a so-called "object omission" occurs when no object is present at the central portion of a photographic frame. In this case, only an out-of-focus photograph can be obtained.

Under the circumstances, devices capable of ranging a plurality of points within a frame have been invented, and various methods of performing focusing on a specific point of a plurality of points have been proposed. For example, a method of selecting the nearest point in a photographic frame as a focal point is disclosed in U.S. Pat. No. 4,470,681 and the like, and a method of center-priority focusing is disclosed in U.S. Pat. No. 4,748,469 and the like.

The nearest object in a photographic frame is not always a main object. That is, with a simple application of the method of selecting the nearest point, when, for example, an object located behind a table is to be photographed, the lens is focused on the table. As a result, the object becomes out of focus.

On the other hand, with the center-priority focusing method, the "object omission" preventing effect will deteriorate.

SUMMARY OF THE INVENTION

It is, therefore, an object of the present invention to provide a new and improved autofocusing apparatus for a camera, which can prevent a lens from being focused on undesired objects such as a table and a wall, has an "object omission" preventing effect, and can reduce the adverse effect of autofocusing.

According to one aspect of the present invention, there is provided an autofocusing apparatus for a camera, comprising: a photographing lens for forming an object image on a film surface; a first ranging unit for measuring a distance to an object located at a substantially a central portion of a photographic frame of the camera, and outputting a first ranging result; a second ranging unit for measuring a distance to an object located at a peripheral portion of the photographic frame, and outputting a second ranging result; a control unit for receiving the first and second ranging results obtained by the first and second ranging units and determining a focusing position of the photographing lens, the control unit determining whether the first ranging result obtained by the first ranging unit is larger than a first predetermined distance, and, when the control unit determines that the first ranging result is larger than the first predetermined distance, selecting and outputting one of the first and second ranging results which is nearer to a second predetermined distance; and a focus control unit for receiving the output from the control unit and controlling the photographing lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention.

FIG. 1 is a block diagram showing the concept of the first embodiment of a camera having a multiple ranging device of the present invention;

FIGS. 2A to 2C are views, each showing a composition of objects;

FIG. 16 is a block diagram showing the arrangement of a camera having a multiple ranging device according to the fifth embodiment of the present invention;

FIG. 17 is a graph showing the relationship between the photographing magnifications of objects at central and peripheral portions of a frame and the object distribution probabilities;

FIGS. 25A to 25F are views showing typical scenes;

FIG. 26 is a table conceptually showing the correspondence between ranging points 114a, 114b, and 114c in each of the scenes shown in FIGS. 25A to 25F and "long-distance", "middle-distance", and "short-distance";

FIG. 31 is a flow chart for explaining an operation of the thirteenth embodiment of the present invention.

DETAILED DESCRIPTION OF THE PREFERRED EMBODIMENTS

Figure 3:
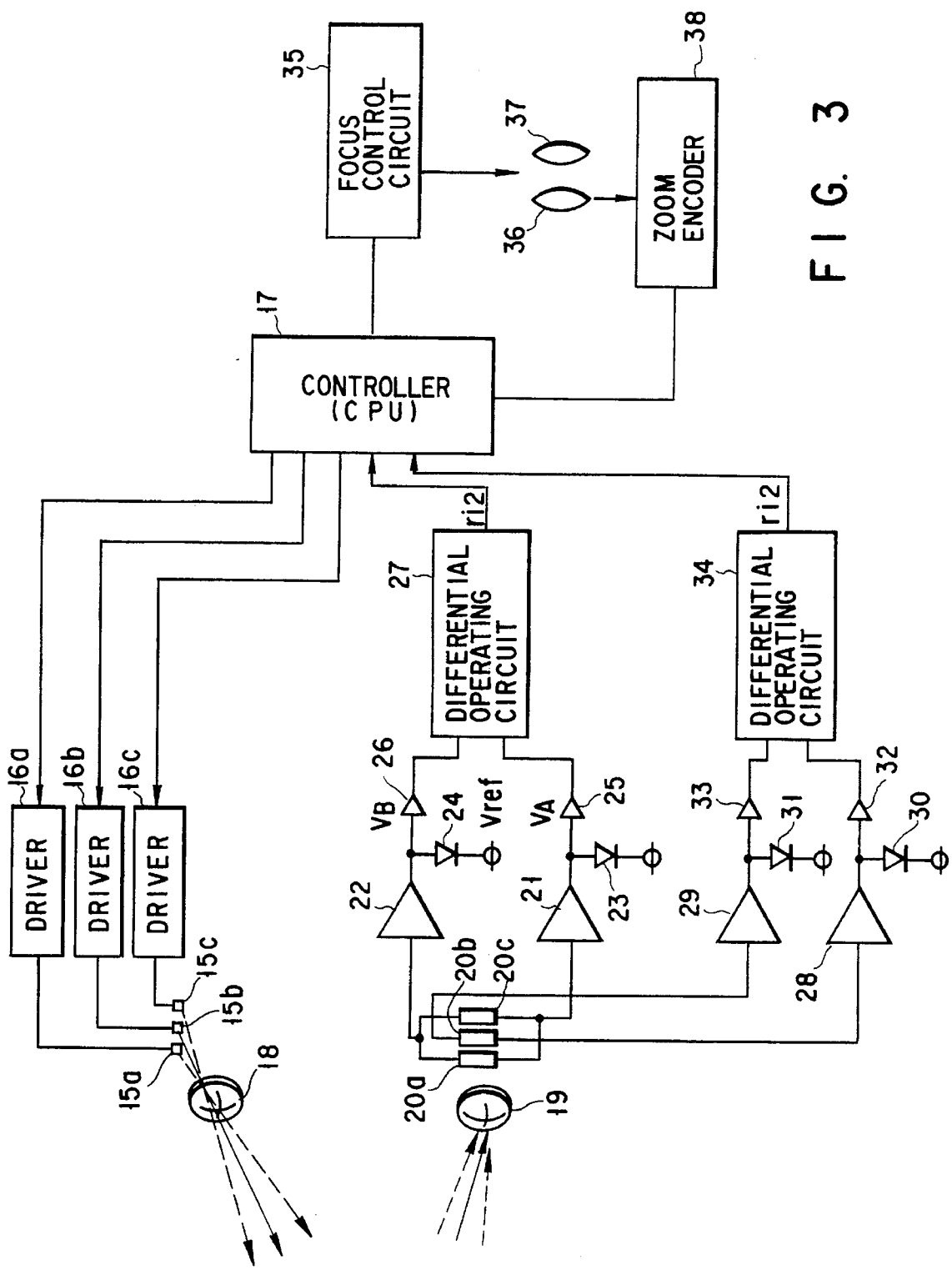
FIG. 3 is a block diagram showing the arrangement of a camera having a multiple ranging device according to the second embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described blow.

The concept of the present invention has been described in Summary of the Invention. In the following embodiments, arrangements designed to realize higher in-focus ratios by using the result obtained by ranging a central portion, of each frame, where 80% of main objects are considered to be present, and by using the results obtained by the conventional well-known nearest point selection method will be described below with reference to more practical situations.

FIG. 1 is a block diagram showing the concept of the first embodiment of the present invention. Referring FIG. 1, a central ranging section 1 is a means for ranging a substantially central portion of a photographic frame, and a peripheral ranging section 2 is a means for ranging a substantially peripheral portion of the photographic frame. An output from the central ranging section 1 is supplied to a comparator 3, a nearest point determining section 4, and a selecting section 5. An output from the peripheral ranging section 2 is supplied to the nearest point determining section 4 and the selecting section 5. The first and second predetermined values are input from first and second predetermined value input sections 6 and 7 to the comparator 3 and the selecting section 5, respectively.

A gate circuit 9 receives a determination result from the nearest point determining section 4 together with a comparison result from the comparator 3 via an inverter 8. Meanwhile, a gate circuit 10 receives outputs from the comparator 3 and the selecting section 5. A focus control section 11 controls a focusing lens 12 in accordance with output results from the gate circuits 9 and 10.

with this arrangement, the substantially central portion of the photographic frame is ranged by the central ranging section 1, and the substantially peripheral portion is ranged by the peripheral ranging section 2. An output from the central ranging section 1 is compared with the first predetermined value, supplied from the first predetermined value input section 6, by the comparator 3. When the output from the central ranging section 1 is larger than the first predetermined value, an output from the comparator 3 is set at high level (H). As a result, the gate circuit 10 is enabled. In contrast to this, when the output from the central ranging section 1 is smaller than the first predetermined value, the output from the comparator 3 is set at low level (L). As a result, the gate circuit 9 is enabled via the inverter 8.

The nearest point determining section 4 selects one of the outputs, from the central ranging section 1 and the peripheral ranging section 2, which exhibits the minimum distance. The selected distance signal is input to the gate circuit 9. The selecting section 5 determines which one of the outputs from the central ranging section 1 and the peripheral ranging section 2 is nearer to the second predetermined value from the second predetermined value input section 7, and outputs the selected output to the gate circuit 10. The focus control section 11 then controls the focusing lens 12 in accordance with the output from the gate circuit 9 or 10 which is enabled.

In the camera having the multiple ranging device with the above-described arrangement, when an output from the first predetermined value input section 6 indicates a short distance of, e.g., 1 m, and an output from the second predetermined value input section 7 is set to a distance of, e.g., about 2.5 m, at which a whole human figure can be photographed, photographs in focus can be obtained in the scenes shown in FIGS. 2A to 2C, respectively.

The photograph of flowers shown in FIG. 2A is obtained by so-called macro-photography. Of such objects, main objects tend to be located at a central portion of a frame 13. It is difficult to take a photograph of such a near object in focus because of the parallax between the ranging system and the photographing system of a camera, even if the camera is properly positioned to set the object in the ranging frame, unless a camera having no such a parallax, e.g., a single-lens reflex camera, is used. If a flower is very small, a ranging signal may not properly hit the flower. In such a scene, therefore, an "object omission" phenomenon tends to occur unless the lens is focused on the nearest object by using the nearest point determining section 4.

Referring to FIG. 2A, ranging points 14a, 14b, and 41c respectively correspond distances of 0.6 m, 0.8 m, and 1 m. Even if a photographer tries to shoot a small flower with the ranging frame, as shown in FIG. 2A, a signal is improperly projected owing to the parallax.

FIG. 2B shows a scene which cannot be properly photographed by a conventional multi-AF (autofocus) camera of the nearest point selection scheme. Although a human figure as a main object is located in the center of a frame, the lens cannot be focused on the human figure because the left and right walls are located at shorter distances than the human figure. In this case, the ranging results at points 14a, 14b, and 14c are 1.5 m, 3 m, and 1.5 m, respectively. According to this embodiment, one of the object distances which is nearer to the second predetermined distance, 2.5 m, is selected by the selecting section 5. Therefore, "3 m" at the ranging point 14b is selected. As a result, the lens is properly focused on the object in the center of the frame.

In the case shown in FIG. 2C in which main objects are located at the left and right portions of a frame, an out-of-focus photograph with an "object omission" is obtained by a camera which can range only an object located in the center of a frame. In the embodiment, when the distances measured at points 14a, 14b, and 14c are 1.5 m, 20 m, and 1.5 m, respectively, the lens can be properly focused on the human figures because "1.5 m" is nearer to the second predetermined value than "20 m".

FIG. 3 is a block diagram showing the arrangement of a camera having a multiple ranging device according to the second embodiment of the present invention. This embodiment uses a known active trigonometric ranging device for radiating light on an object and obtaining an object distance on the basis of the incident position of the reflected signal light.

Three infrared-emitting diodes 15a, 15b, and 15c are controlled by a CPU 17 through drivers 16a, 16b, and 16c. Infrared rays from the IREDs 15a, 15b, and 15c are radiated on an object (not shown) through a light-emitting lens 18. The rays reflected by the object are incident on light position detecting elements (PSDs) 20a, 20b, and 20c through a light-receiving lens 19.

Outputs from the PSDs 20a to 20c are supplied to a differential operating circuit 27 via preamplifiers 21 and 22, compression diodes 23 and 24, and buffer circuits 25 and 26. Meanwhile, an output from the PSD 20b is supplied to a differential operating circuit 34 via preamplifiers 28 and 29, compression diodes 30 and 31, and buffer circuits 32 and 33. Outputs from the differential operating circuits 27 and 34 are supplied to a controller (CPU) 17 constituted by a microprocessor.

The CPU 17 controls a focusing lens 37 through a focus control circuit 35. Reference numeral 36 denotes a zoom lens. Data representing the zooming position of the zoom lens 36 is input to the CPU 17.

In the camera having the multiple ranging device with the above-described arrangement, ranging infrared rays are emitted from the three IREDs 15a, 15b, and 15c and are radiated on different points in a photographic frame via the light-emitting lens 18. The ranging rays are reflected by an object and are focused by the light-receiving lens 19 to be incident on the PSDs 20a, 20b, and 20c, respectively. The object distance can be obtained from the incident positions of the reflected signal light on the PSDs 20a, 20b, and 20c according to the principle of a known trigonometric ranging method.

Figure 4:
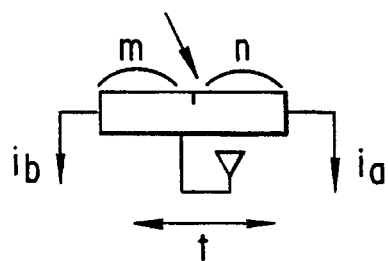
FIG. 4 is a view for explaining a PSD.

As shown in FIG. 4, each of the PSDs 20a, 20b, and 20c is designed to output one of two current signals $i_a$ and $i_b$ depending on the position of a signal light. The current signals $i_a$ and $i_b$ are expressed by equations (1) and (2):

$$i_a = \frac{m}{m+n} i_{p0} \tag{1}$$

$$i_b = \frac{n}{m+n} i_{p0} \tag{2}$$

where $i_{p0}$ is the total signal light current. In addition, since m+n=t and t=length of PSD, equation (3) is established:

$$\frac{i_a}{i_a + i_b} = \frac{m/(m+n)}{(m+n)/(m+n)} = \frac{m}{t} \tag{3}$$

Since m is the incident position of light, and t is a constant, the incident position m of reflected signal light can be obtained by calculating $i_a/(i_a+i_b)$. The object distance can be obtained from the incident position m.

The output currents $i_a$ and $i_b$ from each PSD are amplified by the preamplifiers 21 and 22 or 28 and 29 and are input to the compression diodes 23 and 24 or 30 and 31. The buffer circuits 25, 26, 32, and 33 respectively output the potentials of the compression diodes 23, 24, 30, and 31, each based on a reference potential Vref, to the differential operating circuits 27 and 34.

Figure 5:
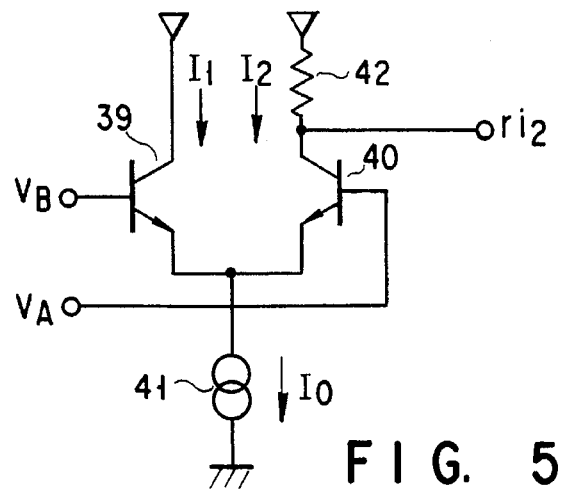
FIG. 5 is a circuit diagram showing the arrangement of a differential operating circuit.

Each of the differential operating circuits 27 and 34 has the arrangement shown in FIG. 5. Referring to FIG. 5, a current source of a current value $I_0$ is connected to the common emitter of a pair of NPN transistors 39 and 40. A resistor 42 is connected to the collector of the transistor 40. The collector currents of the transistors 39 and 40 are respectively represented by $I_1$ and $I_2$.

Letting β be the amplification factor of each preamplifier, output potentials $V_A$ and $V_B$ from each compression diode can be obtained by equations (4) and (5):

$$V_A = V_T \ln \frac{\beta i_a}{I_s} \tag{4}$$

$$V_B = V_T \ln \frac{\beta i_b}{I_s} \tag{5}$$

where $I_s$ is the reverse saturation current of each diode, and $v_T$ is the thermal voltage. The relationship between the output currents $I_1$ and $I_2$ and the output voltages $V_A$ and $V_B$ can be expressed by equation (6):

$$V_A - V_B = V_T \ln \frac{\beta i_a}{\beta i_b} = V_T \ln \frac{i_2}{i_1} \tag{6}$$

$$\therefore \frac{i_a}{i_b} = \frac{i_2}{i_1}$$

On the other hand, since $i_1+i_2=i_0$, equation (7) can be obtained:

$$\frac{i_b}{i_a} i_2 + i_2 = \frac{i_a + i_b}{i_a} \cdot i_2 = i_0 \tag{7}$$

$$\therefore i_2 = \frac{i_a}{i_a + i_b} i_0$$

Therefore, a value $ri_2$ obtained by converting the current $i_2$ into a voltage by the resistor 42 can be expressed by equation (8):

$$ri_2 = \frac{i_a}{i_a + i_b} \cdot i_0 \cdot r = \frac{m}{t} \cdot i_0 \cdot r \qquad (8)$$

That is, since r, $i_0$, and t are predetermined values, the incident position m of signal light to each PSD can be obtained by this value $ri_2$.

The central ranging section 1 shown in FIG. 1 is constituted by the light-emitting and light-receiving lenses 18 and 19, the IRED 15b and its driver 16b, and the PSD 20b and its attached components: the preamplifiers 28 and 29, the compression diodes 30 and 31, the buffer circuits 32 and 33, and the differential operating circuit 34. The peripheral ranging section 2 shown in FIG. 1 is constituted by the light-emitting and light-receiving lenses 18 and 19, IREDs 15a and 15c for ranging left and right portions and their drivers 16a and 16c, the PSDs 20a and 20c, the preamplifiers 21 and 22, the compression diodes 23 and 24, the buffer circuits 25 and 26, and the differential operating circuit 34.

The reason why the preamplifiers and the subsequent components are commonly used for ranging left and right portions of a frame in this case, even though the PSDs for ranging the left and right portions are separately arranged, is that the corresponding IREDs are independently operated. However, the preamplifiers and the subsequent components for a central ranging operation are separated from the above-mentioned arrangement in consideration of an improvement in precision. That is, as the area of a PSD increases, the influences of external disturbances increase, resulting in a decrease in S/N ratio.

The CPU 17 receives the output signal voltages from these ranging sections upon A/D-converting them by an internal A/D converter. The resultant signals are used for focus control in accordance with a predetermined algorithm. As a result, the focusing lens 37 is controlled through the focus control circuit 35. Note that data indicating the zooming position of the zoom lens 36 is input to the CPU 17 via the zoom encoder 38.

The above-mentioned predetermined algorithm will be described next with reference to the flow chart of FIG. 6.

In steps S1, S2, and S3, the CPU 17 sequentially causes the IREDs 15b, 15a, and 15c to emit light through the respective drivers 16b, 16a, and 16c. In each step, the CPU 17 receives the value $ri_2$ shown in FIG. 3. The CPU 17 sequentially obtains object distances lb, la, and lc on the basis of the values $ri_2$.

In step S4, the ranging result lb at the central point is compared with a predetermined distance $l_{COM}$ (e.g., 1 m). If the distance lb is smaller than the distance $l_{COM}$, the flow advances to step S5 to select the minimum distance of the distances la, lb, and lc, and focusing is performed in accordance with the selected distance.

If it is determined in step S4 that the distance lb is larger than the distance $l_{COM}$, the flow advances to step S6 to receive a zoom f value from the zoom encoder 38. In step S7, the CPU 17 calculates a distance 70 times the f value. In step S8, the CPU 17 selects one of the distances la, lb, and lc which is nearest to the calculated distance, and focuses the lens on a point which is nearest to f×70.

As described above, in this embodiment, the comparator, the selecting section, and the like denoted by reference numerals 3 to 11 in FIG. 1 are substituted by the operation control function of the one-chip microcomputer CPU 17.

Figure 7A:
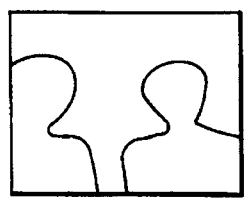
FIGS. 7A to 7C are views, each showing a composition which causes an "object omission" phenomenon.
Figure 7B:
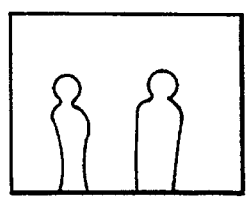
Figure 7C:
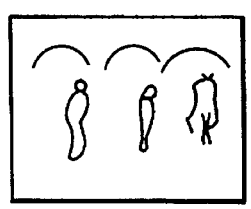

The basic concept of the above-described sequence will be described next with reference to FIGS. 7A, 7B, and 7C. FIGS. 7A, 7B, and 7C show examples of objects which are unsuitable for an AF device capable of ranging only one central point of a frame. That is, a camera incorporating a multi-AF device needs to properly handle such objects. If, however, the camera must be designed to handle all these objects, the lens is focused on the walls in shooting, for example, the object shown in FIG. 2B. That is, the adverse effect of autofocusing tends to occur.

For this reason, according to the present invention, the "object omission" preventing effect is not required with respect to an unnatural composition like the one shown in FIG. 7A and a composition in which human figures are so small that a satisfactory photograph can be taken even if the lens is focused on the background, as shown in FIG. 7C. That is, a multi-AF device exhibiting only a small adverse effect of autofocusing can be provided in consideration of the fact that the composition shown in FIG. 7B is the type of composition which really suffers an "object omission".

Figure 8:
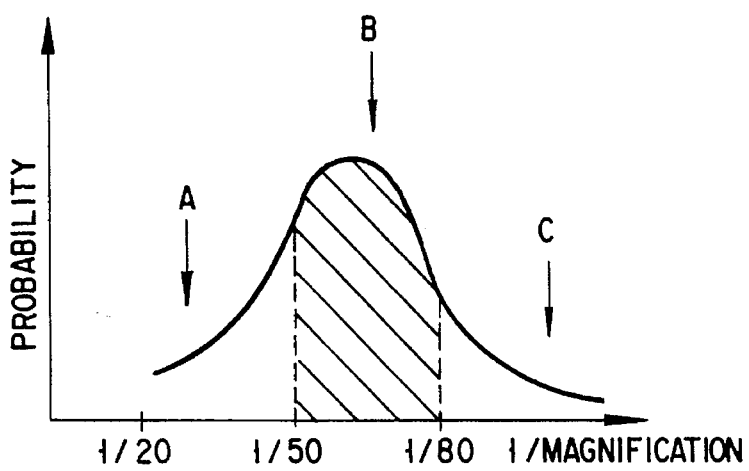
FIG. 8 is a graph showing the relationship between the photographing magnification and the object distribution probability.

FIG. 8 shows the relationship between the photographing magnification and the object distribution probability. In this case, objects like the ones shown in FIG. 7B correspond to magnifications of ×50 to ×80 (corresponding to the portion indicated by an arrow B in FIG. 8). It is apparent that beautiful photographs can be taken at a considerably high probability if this portion is emphasized. Therefore, in steps S7 and S8 in the flow chart of FIG. 6, a distance corresponding to 70×f is used.

Photographs with compositions like the ones shown in FIGS. 7A and 7C are taken at considerably low probabilities, as indicated by arrows A and C in FIG. 8.

Figure 9:
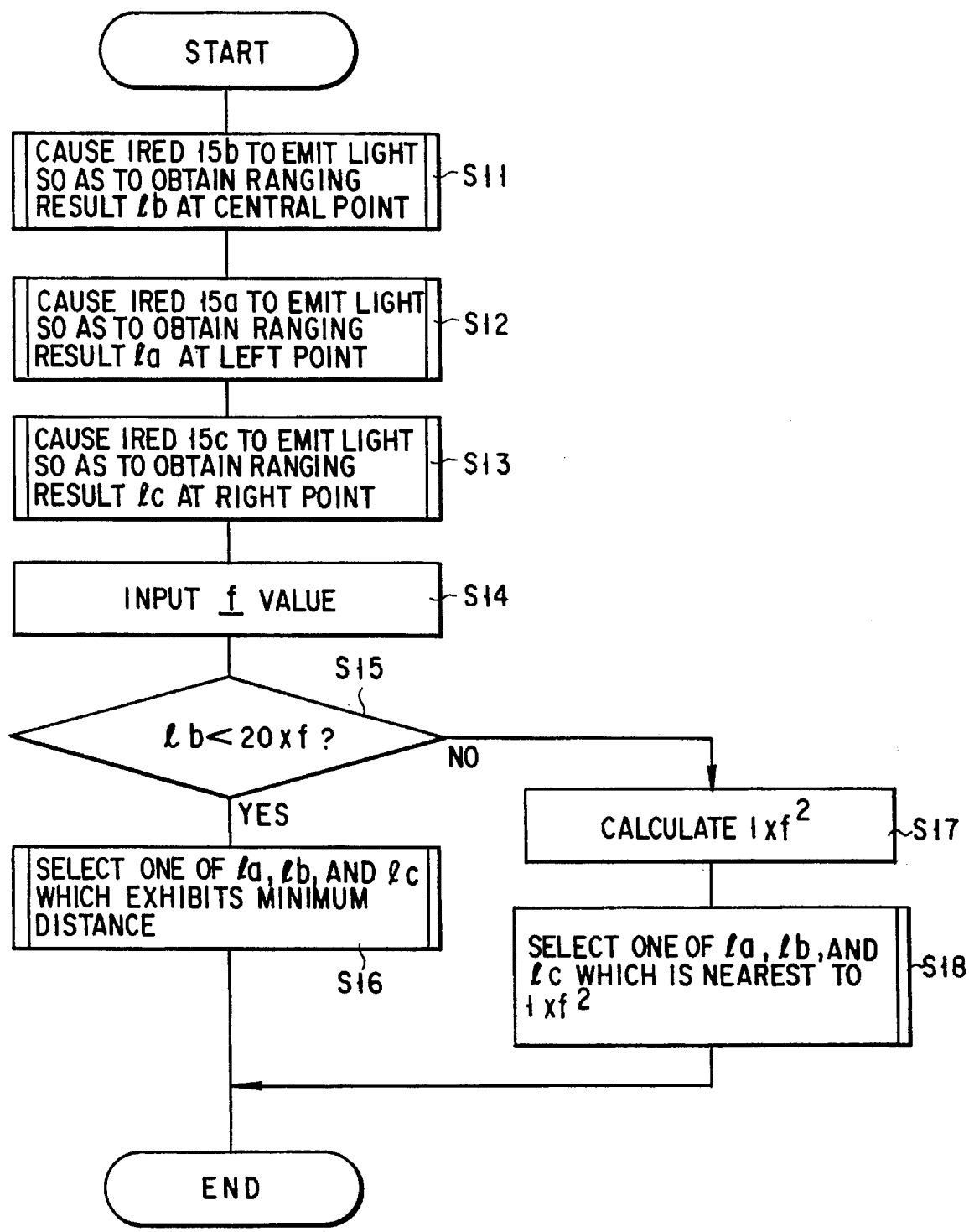
FIG. 9 is a flow chart for explaining an operation of the third embodiment of the present invention.

FIG. 9 is a flow chart for explaining an operation of the third embodiment of the present invention. In the third embodiment, a distance $l_{COM}$ as a criterion for selecting the nearest point selection scheme or the predetermined-magnification-priority scheme is also determined depending on the magnification of a photographing lens. In the flow chart shown in FIG. 6, this distance $l_{COM}$ is fixed to 1 m as a so-called macrophotography region limit. However, in the third embodiment, since there is a strong correlation between the photographing magnification and the probability of photographs even in macro-photography, the distance $l_{COM}$ is made magnification dependent.

More specifically, photographs obtained by macrophotography exhibit the maximum probability near a magnification of ×10. In this embodiment, whether the photographer tries to perform macro-photography or take a snap which may suffer an "object omission" is determined on the basis of the photographing magnification.

Figure 6:
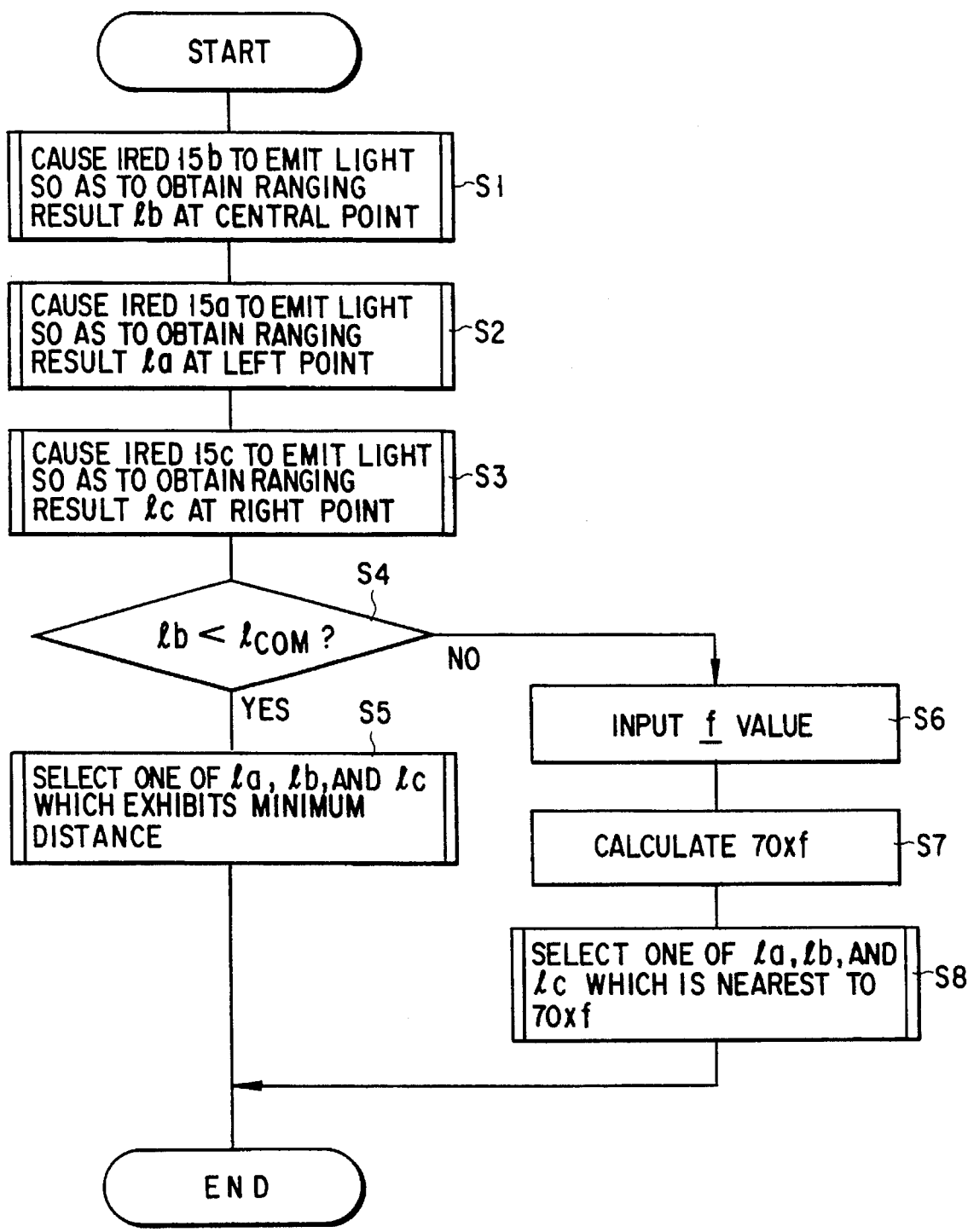
FIG. 6 is a flow chart for explaining an operation of the second embodiment.

In the third embodiment, the expression of the predetermined-magnification-priority scheme in step S7 in FIG. 6 is substituted by an expression of a focal point proportional to the square of a value f (step S17). This expression is based on the following consideration. The photographer tends to photograph a remote object at the telephoto end of the zoom lens. Therefore, with an increase in focal length, greater importance is given to a remoter object. In the third embodiment, priority is given to an object at a distance of 1.6 m for a focal length of 40 mm; and priority is given to an object at a distance of 10 m for a focal length of 100 mm.

The remaining steps are the same as those in the second embodiment. In steps S11, S12, and S13, ranging is performed at central, right, and left points in a frame. In step S14, the focal length of the photographing lens in a photographic operation is read by a zoom encoder 38. In step S15, it is checked whether a scene which is to be photographed by the user belongs to a macro-region or a snap region.

If it is determined in step S15 that the scene belongs to the macro-region, it is considered that "spot miss" tends to occur because the object is small, and the parallax is large. Therefore, the flow advances to step S16 to perform the nearest point selecting scheme. In contrast to this, if it is determined otherwise (the scene belongs to a region other than the macro-region), a snap like the one shown in FIG. 7B is selected. In addition, since a remoter object must be covered on the long-focus side, focusing is performed with priority being given to a distance corresponding to f2 in steps S17 and S18.

Figure 10:
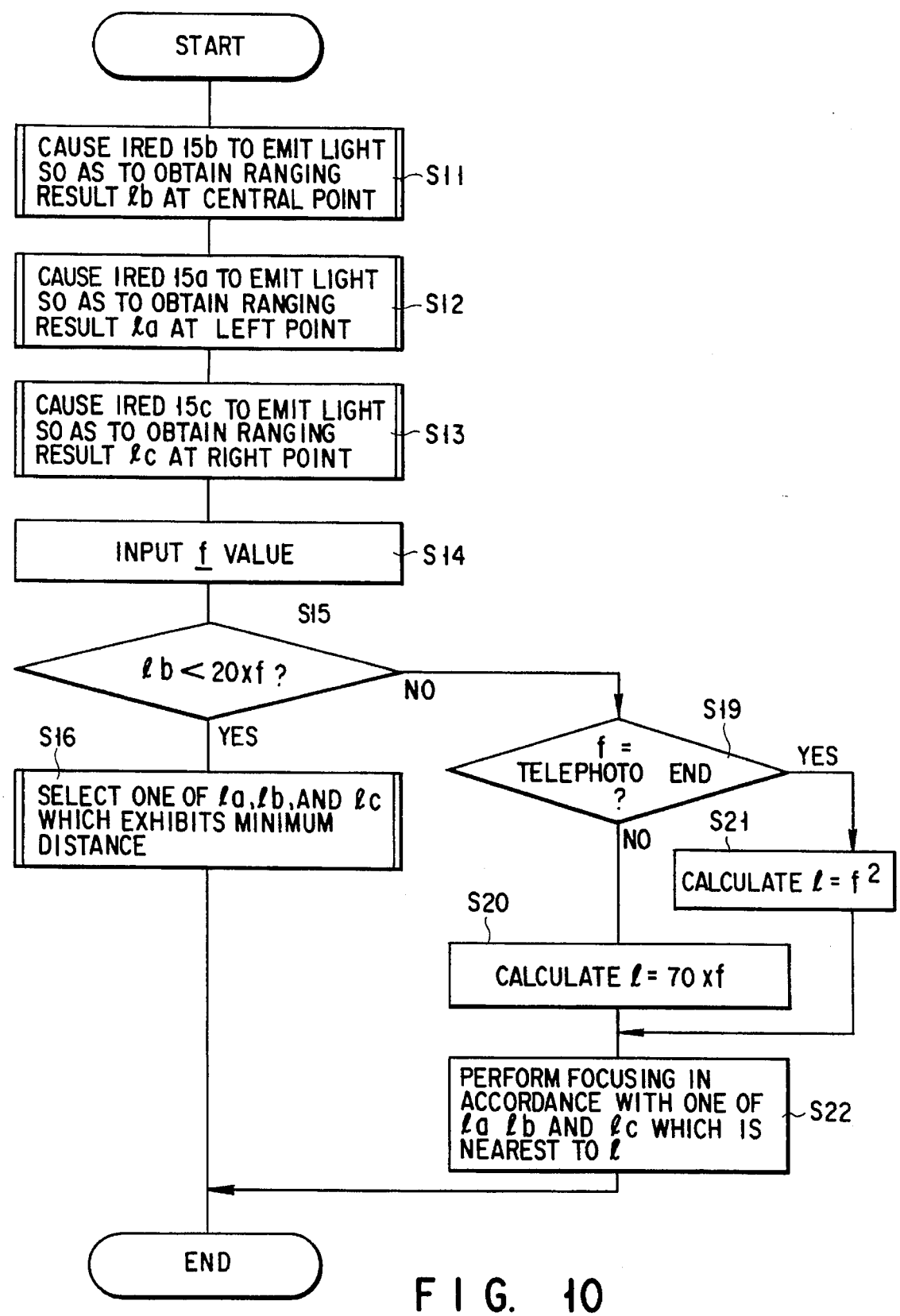
FIG. 10 is a flow chart for explaining an operation of a modification of the third embodiment of the present invention.

The processing in steps S17 and S18 in FIG. 9 may be replaced with different processing only in the telephoto end mode, as indicated by steps S19 to S22 in the flow chart of FIG. 10. More specifically, the processing in steps S11 to S16 is the same as that in the flow chart of FIG. 10, but step S17 is replaced with steps S19, S20, and S21. with this arrangement, consideration is given to the actual situation of photography that a remote object tends to be aimed especially at the telephoto end. Similar to the second embodiment, magnification-priority focusing is performed except for the telephoto end, as indicated by step S20.

Figure 11:
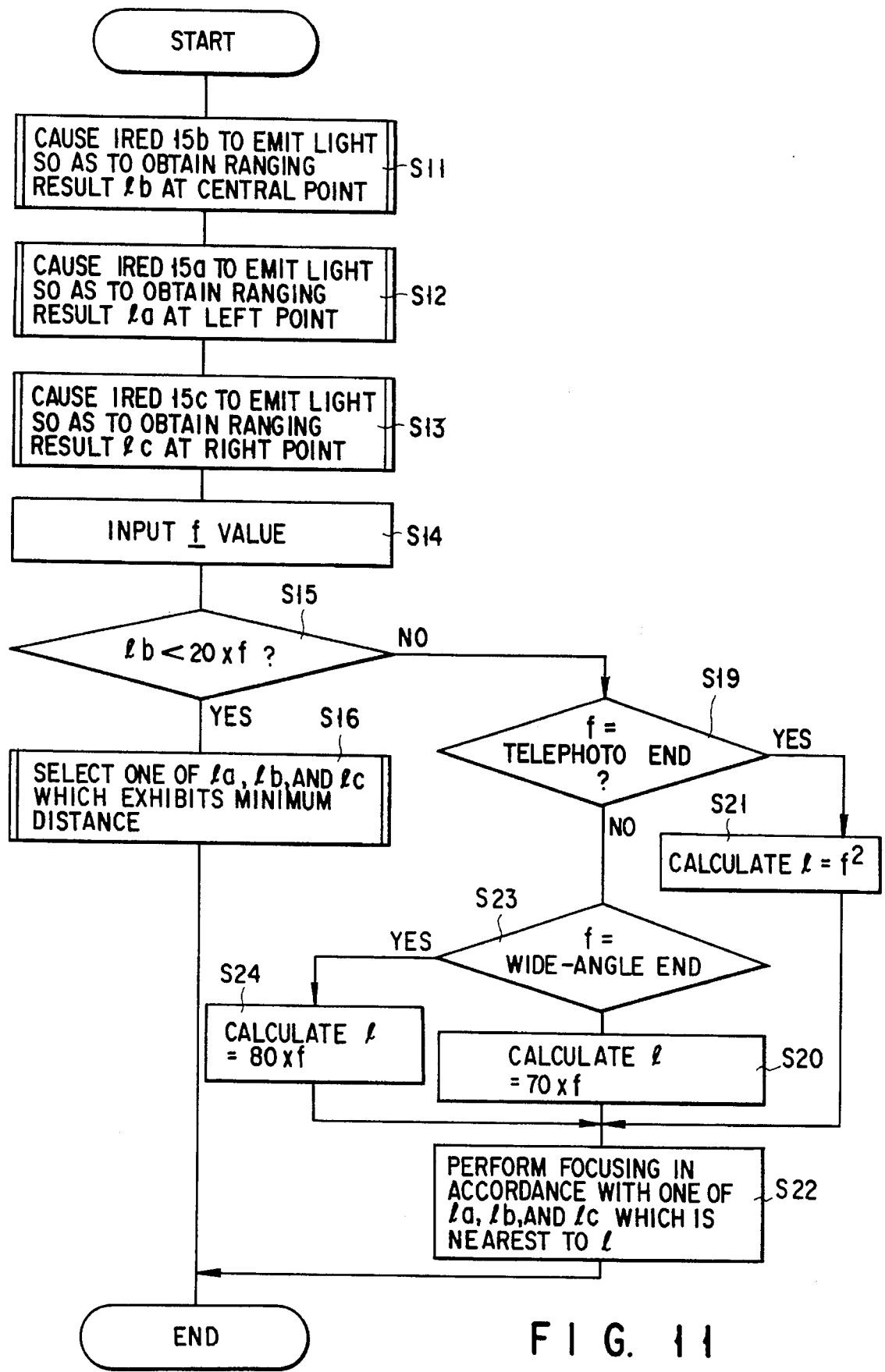
FIG. 11 is a flow chart for explaining an operation of another modification of the third embodiment of the present invention.

According to this idea, at the wide-angle end, the photographer usually wants to take a photograph having a composition including a background scene in a large proportion, and hence human figures become small in size relative to the background scene. In consideration of this tendency, at the wind-angle end, the priority distance l may be set slightly increased. In this case, as indicated by the flow chart of FIG. 11, steps S23 and S24 are added to the flow chart of FIG. 10. More specifically, if the wide-angle end is determined in step S23, the flow advances to step S24 to calculate a distance 80 times f. If neither the telephoto end nor the wide-angle end are determined, a distance 70 times f is calculated in step S20. Since the remaining steps are the same as those described above, a description thereof will be omitted.

Figure 12A:
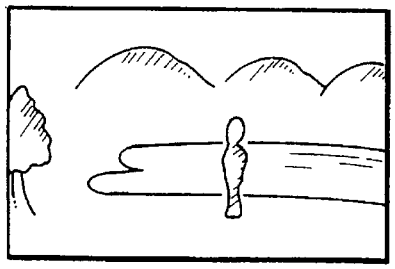
FIGS. 12A to 12C are views of an object indicating changes in area (photographing magnification) occupied by the object in a photographic frame as the object distance changes.
Figure 12B:
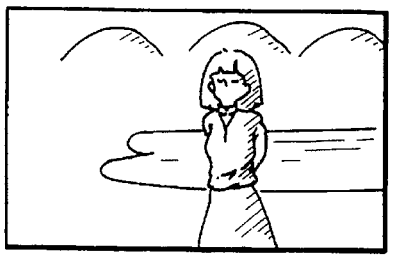
Figure 12C:

If the focal length of the photographing lens is predetermined, as shown in, for example, FIGS. 12A to 12C, the area, in a frame, occupied by an object (photographing magnification) changes.

In the frame shown in FIG. 12A, the distance between the object and the photographer is large, whereas in the frame shown in FIG. 12C, the distance is small. If these distances are expressed by photographing magnifications, the distance in FIG. 12A is expressed by a magnification of x1/100; the distance in FIG. 12B, a magnification of x1/60; and the distance in FIG. 12C, a magnification of x1/10.

FIG. 8 is a graph showing the relationship between the photographing magnification and the statistical probability of photography. As is apparent, photography is performed with the size shown in FIG. 12B in many cases.

In the following embodiment, an object distance at which the photographer wants to perform photography is determined from a plurality of ranging results on the basis of such a relationship.

The fourth embodiment of the present invention will be described below with reference to FIGS. 13 to 15A and 15B.

Figure 13:
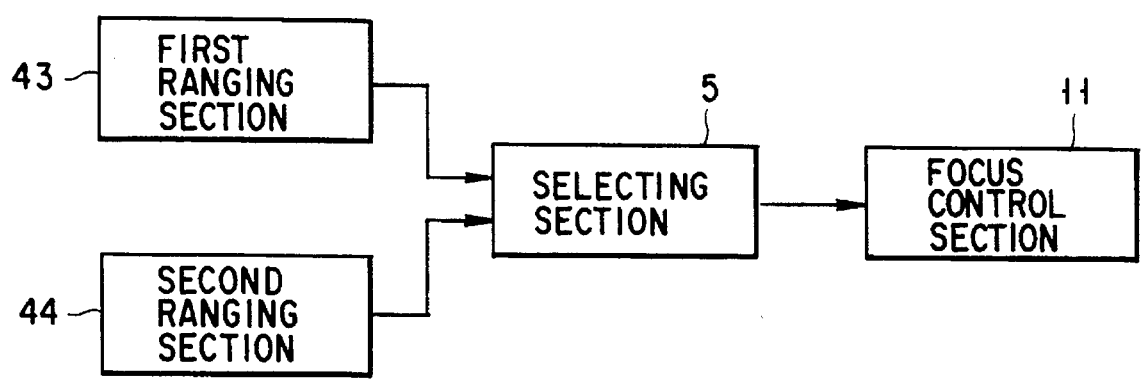
FIG. 13 is a block diagram showing the arrangement of a camera having a multiple ranging device according to the fourth embodiment of the present invention.

FIG. 13 is a block diagram showing a camera having a multiple ranging device, in which ranging outputs obtained by the first and second ranging sections are supplied to a selecting section 5. A focus control section controls a focusing lens (not shown) in accordance with a selection result obtained by the selecting section 5.

Figure 14:
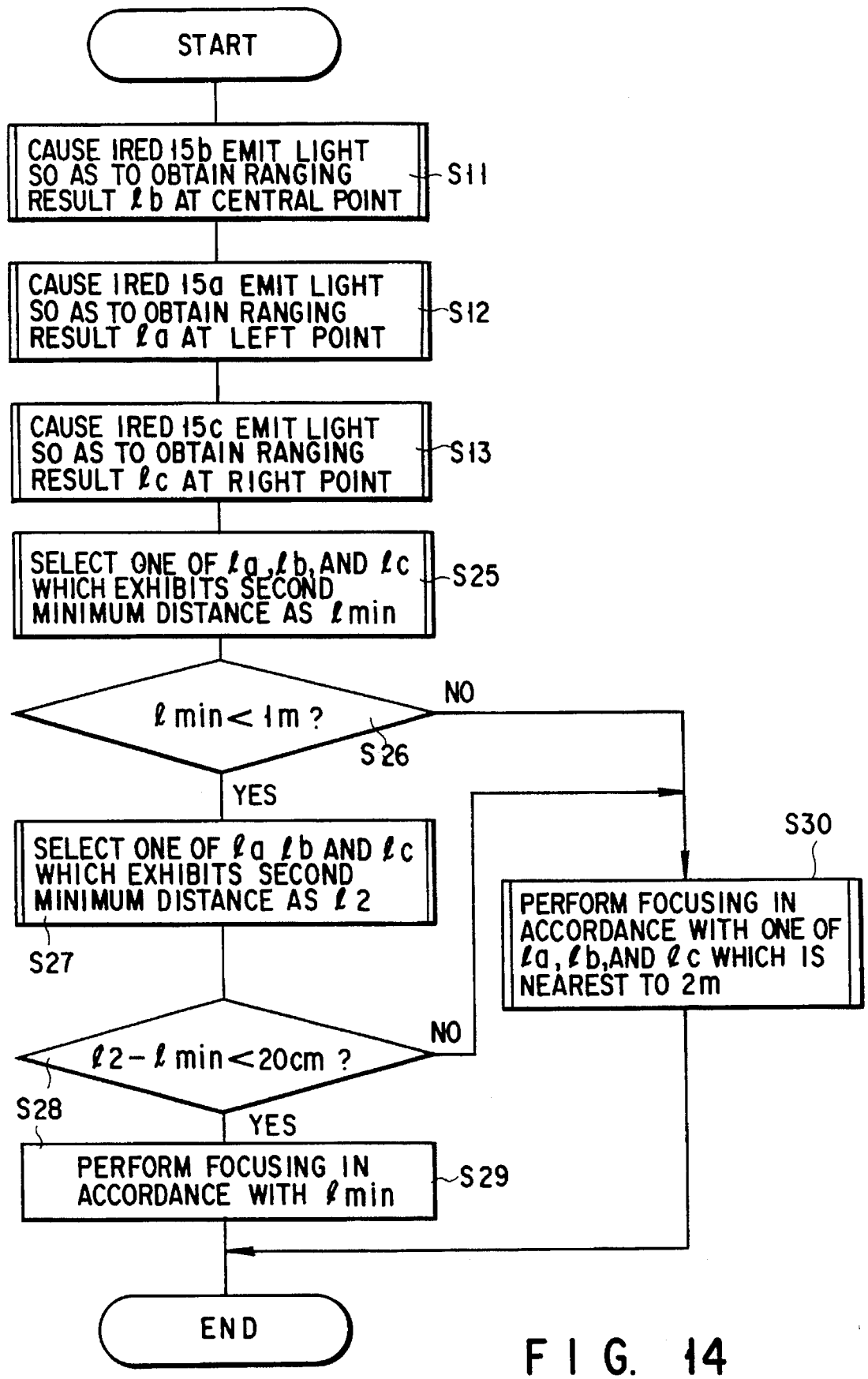
FIG. 14 is a flow chart for explaining an operation of the fourth embodiment.

In this case, an object at a substantially central portion of a photographic frame is ranged by a first ranging section 43, and an object at a peripheral portion of the frame is ranged by a second ranging section 44. The selecting section 5 selects one of the outputs, from the first and second ranging sections, which is nearer to a predetermined object distance. The focusing lens is controlled by a focus control section 11 in accordance with the selection result. FIG. 14 is a flow chart for explaining an operation substituting the determination of macro-photography on the basis of the ranging result lb at the central point. In this case, even if an "object omission" occurs in macro-photography as in the photograph of branches of a tree shown in FIG. 15A, focusing can be properly performed.

In steps S11 to S13, IREDs 15b, 15a, and 15c are sequentially caused to emit light, and ranging results at the respective points in the frame are obtained. In step S25, one of the results which represents the minimum distance is selected as a distance $l_{min}$. In step S26, it is checked whether the distance $l_{min}$ is smaller than a predetermined distance (e.g., 1 m).

If the distance $l_{min}$ is smaller than the predetermined distance, the flow advances to step S27 to select one of the results which represents the second minimum distance as a distance $l_2$. If it is determined in step S28 that the distances $l_2$ and $l_{min}$ are smaller than a second predetermined distance (e.g., 20 cm), it is considered that two of the three ranging points exhibit short distances. As a result, the flow advances to step S29 to perform focusing in accordance with the distance $l_{min}$.

If it is determined in step S26 that the distance $l_{min}$ is larger than the predetermined distance, the flow advances to step S30 to perform focusing in accordance with one of three distances la, lb, and lc which is nearest to the third predetermined distance (2 m).

Figure 15A:
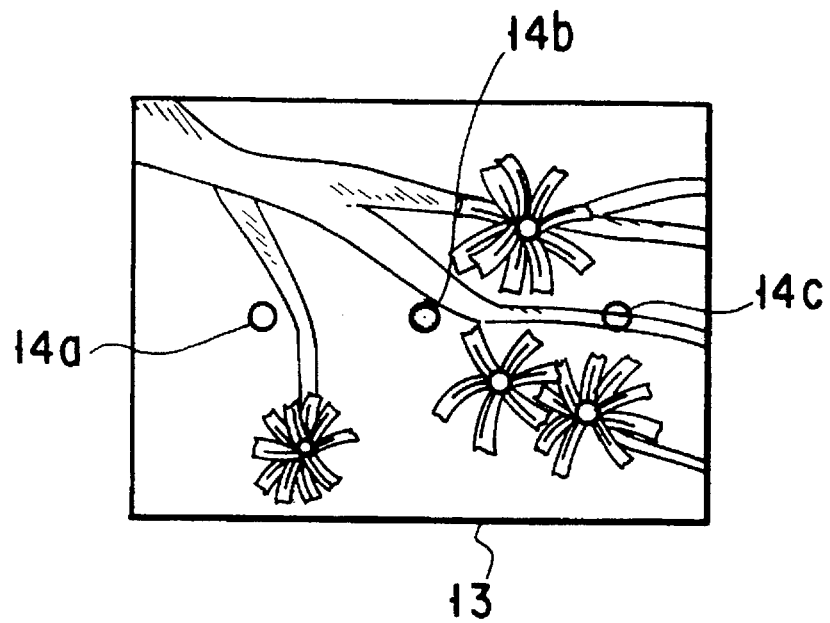
FIGS. 15A and 15B are views showing objects to be photographed in the operation of the fourth embodiment.
Figure 15B:
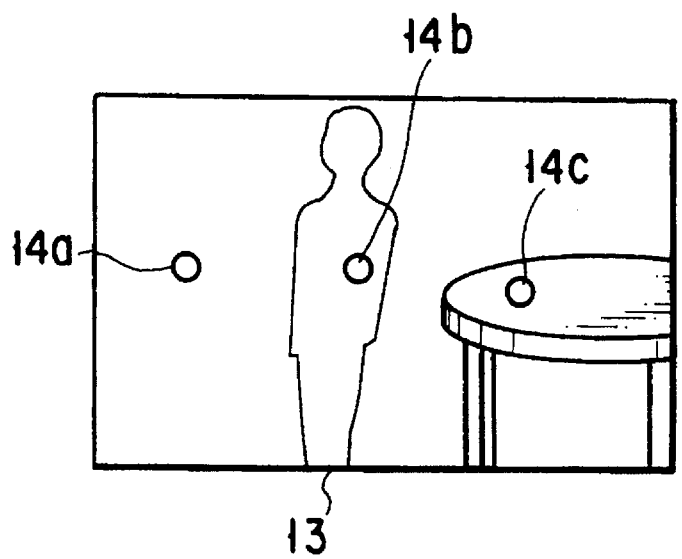

According to the fourth embodiment, there is provided a multiple-AF device which is free from the adverse effect of autofocusing that the lens is focused on an undesired object like the one at a ranging point 14c in a scene like the one shown in FIG. 15B.

The fifth embodiment of the present invention will be described next with reference to FIGS. 16 to 18A and 18B.

When objects at a central point and peripheral points in each frame are compared with each other, it is found that the probability that the objects at the peripheral points are photographed at predetermined magnifications is higher than that of the object at the central point, as shown in FIG. 17, which shows the relationship between the photographing magnification and the probability of existence of main objects. That is, when the compositions shown in FIGS. 7A and 12C are compared with each other, the probability of existence of the composition shown in FIG. 12A is higher than that of the composition shown in FIG. 7A, even though both the compositions are subjected to photography at short distances and large magnifications.

For this reason, in the fifth embodiment having the arrangement shown in FIG. 16, a selecting section 5 for selecting an object distance near to the second predetermined distance receives no data from a central ranging section 1 but receives only output data from a peripheral ranging section 2, unlike the first embodiment shown in FIG. 1. As is apparent, it is assumed that this peripheral ranging section can obtain at least ranging data at left and right points.

An output from the central ranging section 1 is compared with the first predetermined value from a first predetermined value input section by a comparator 3. The output result is used to select a gate 9 or a gate 10 through an inverter 8, as in FIG. 1. With this operation, a focus control section 11 controls a focusing lens 12 in accordance with the ranging result at the central point through the gate 9, or controls the focusing lens 12 in accordance with a distance near to the second predetermined value, selected on the basis of the ranging results at the peripheral points, through the gate 10. More specifically, if the ranging data at the central point is smaller than, for example, 5 m, center-priority focusing is performed. Otherwise, focusing is performed in accordance with one of the ranging data at the left and right points which is nearer to, for example, 2 m.

In general, the comparator 3, the selecting section 5, the subsequent components, and the focus control section 11 can be substituted by, e.g., a one-chip microcomputer (CPU) for sequence control of a camera.

Figure 18A:
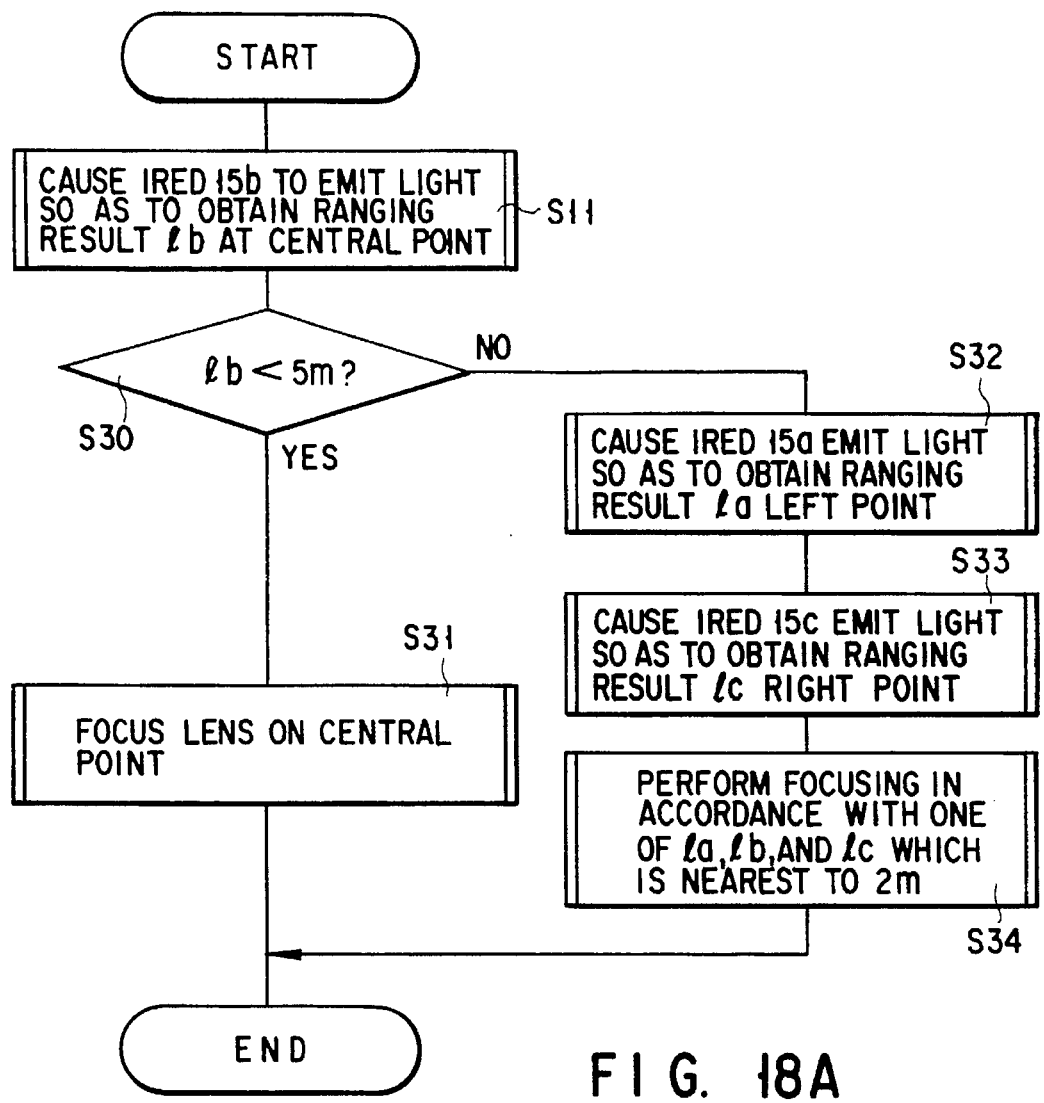
FIG. 18A is a flow chart for explaining an operation of the fifth embodiment.

An operation of the fifth embodiment will be described below with reference to the flow chart shown in FIG. 18A. In the fifth embodiment, it is assumed that the arrangement shown in FIG. 3 is employed. When the lens is to be focused on an object at a central point in a frame, only the IRED 15b in FIG. 3 is caused to emit light, thus shortening a time lag caused by focusing of the camera.

In step S11, the above-mentioned central ranging IRED 15b is caused to emit light to obtain a ranging result lb at the central point. It is checked in step S30 whether the result lb is smaller than 5 m. If it is determined in step S30 that the result is smaller than 5 m, the flow advances to step S31 to perform focusing in accordance with the ranging result lb at the central point.

If it is determined in step S30 that the result lb is larger than 5 m, IREDs 15a and 15c are sequentially caused to emit light to obtain ranging results la and lc at the left and right points in steps S32 and S33. In step S34, focusing is performed in accordance with one of the results la and lc which is nearer to 2 m.

Figure 18B:
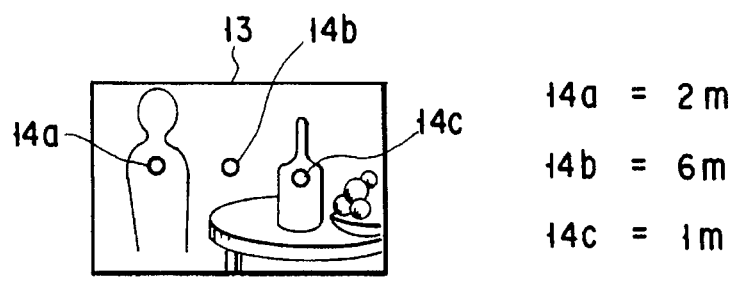
FIG. 18B is a view showing objects to be photographed in the operation of the fifth embodiment.

In the fifth embodiment, as shown in FIG. 18B, the lens can be focused on a human figure as a main object (ranging point 14a), even if a vase as an undesired object (ranging point 14c) is at a shorter distance than the human figure.

The sixth embodiment of the present invention will be described next with reference to FIGS. 19A and 19B. The arrangement of the sixth embodiment is also assumed to be identical to that of the circuit shown in FIG. 3, and sequence control is performed by a CPU 17.

Similar to the flow chart shown in FIG. 6, assume that in steps S11 to S13, ranging at central, left, and right points in a frame are performed, and the respective results are represented by la, lb, and lc. In step S25, one of the ranging results la, lb, and lc which exhibits the nearest point is selected as a value $L_{min}$.

In step S35, it is checked whether the ranging result lb at the central point is equal to the value $l_{min}$. If lb=$l_{min}$, focusing is performed in accordance with the ranging result lb. If lb≈$l_{min}$, since it is considered that an "object omission" may occur, the flow advances to step S36. In step S36, a focal length f of the photographing lens of the camera is input. In step S37, focusing is performed in accordance with one of the ranging results la and lc at the left and right points which is nearer to 50×f.

That is, in the sixth embodiment, an "object omission" is determined by comparing the value $l_{min}$ with the result lb. When an "object omission" is determined, a main object is selected by performing magnification-priority selection of ranging data.

Even if, therefore, the central point does not exhibit data larger than 5 m, as in the fifth embodiment, photography without an "object omission" can be performed. That is, even in the scene shown in FIG. 19B, if the focal length f is 40 mm, the camera can be focused on the ranging point 14a at which the human figure is present.

The arrangement of each embodiment described above is designed to range three points in a frame. However, the number of ranging points can be increased as needed if components corresponding to the IREDs 15a, 15b, and 15c,
the PSDs 20a, 20b, and 20c, the attached drivers and amplifiers, and the like are added to the arrangement shown in FIG. 3, and are switched to be used.

Figure 20A:
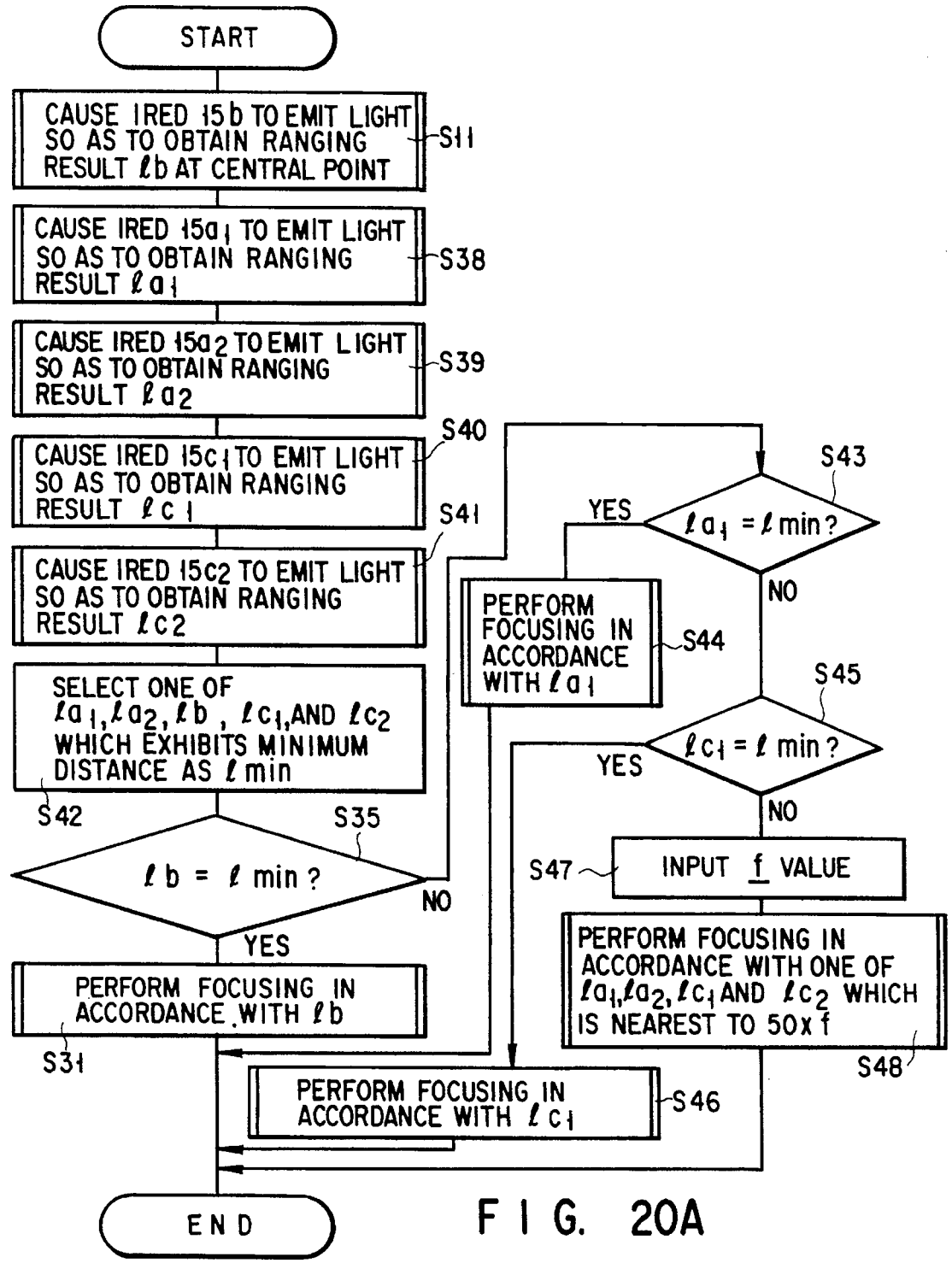
FIG. 20A is a flow chart for explaining an operation of the seventh embodiment of the present invention.
Figure 20B:
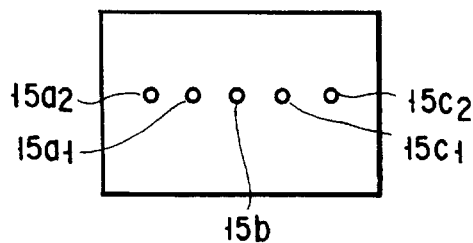
FIG. 20B is a view showing the arrangement of five IREDs applied to a multi-AF device of a type capable of ranging five points within a frame according to the seventh embodiment.

FIGS. 20A and 20B show the seventh embodiment in which the present invention is applied to a multi-AF device of a type capable of ranging five points in a frame. FIG. 20A is a flow chart for explaining an operation of a ranging device for ranging five points in a frame like the one shown in FIG. 20B. Assume that IREDs are arranged in correspondence with five points $15a_1$, $15a_2$, $15b$, $15c_1$, and $15c_2$, viewed from the left, as shown in FIG. 20B.

In steps S11 and S38 to S41, the IREDs are sequentially caused to emit light (in this case, in the order of $15b$, $15a_1$, $15a_2$, $15c_1$, and $15c_2$). The CPU then receives the ranging results at the five ranging points (lb, $la_1$, $la_2$, $lc_1$, and $lc_2$). In step S42, one of these ranging results which exhibits the minimum distance is selected as a value $l_{min}$.

In step S35, it is checked whether the ranging result lb is equal to the value $l_{min}$. If it is determined that the ranging result lb is equal to the value $l_{min}$, the flow advances to step S31 to perform focusing in accordance with the ranging result lb.

If lb≈$l_{min}$ is determined in step S35, ranging results $la_1$ and $lc_1$ at the inner points of the left and right ranging points are compared with the value $l_{min}$ in steps S43 and S45. If either of the ranging results $la_1$ and $lc_1$ is equal to the value $l_{min}$, the flow advances to step S44 or S46 to perform focusing in accordance with the corresponding ranging result.

If it is determined in steps S43 and S45 that none of the ranging results lb, $la_1$, and $lc_1$ is equal to the value $l_{min}$, the flow advances to step S47 to receive a focal length K of the photographing lens. In step S48, one of the ranging results $la_1$, $la_2$, $lc_1$, and $lc_2$ at the four peripheral points which is nearest to 50×f is selected, and focusing is performed in accordance with the selected ranging result. Note that in this case, focusing may be performed by selecting one of the ranging results $la_1$, $la_2$, lb, $lc_1$, and $lc_2$ at all the five points including the central point which is nearest to 50×f.

The seventh embodiment is based on the assumption that a main object at a peripheral portion of a frame exists near a predetermined magnification, and when the photographer performs framing of an object near a central portion of the frame, the object can be considered as a main object, as in the case described with reference to FIG. 17.

Figure 21A:
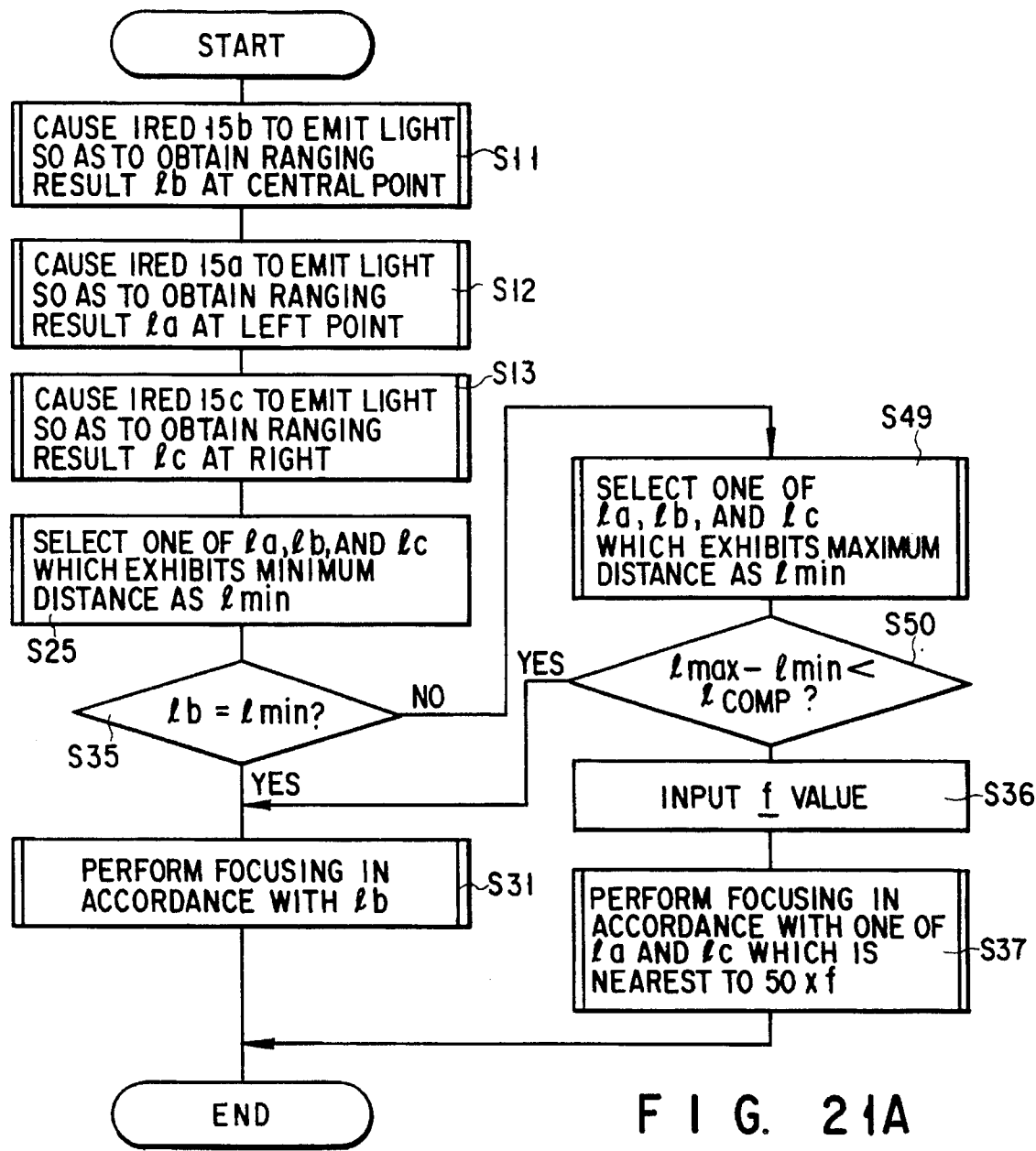
FIG. 21A is a flow chart for explaining an operation of the eighth embodiment of the present invention.
Figure 21B:
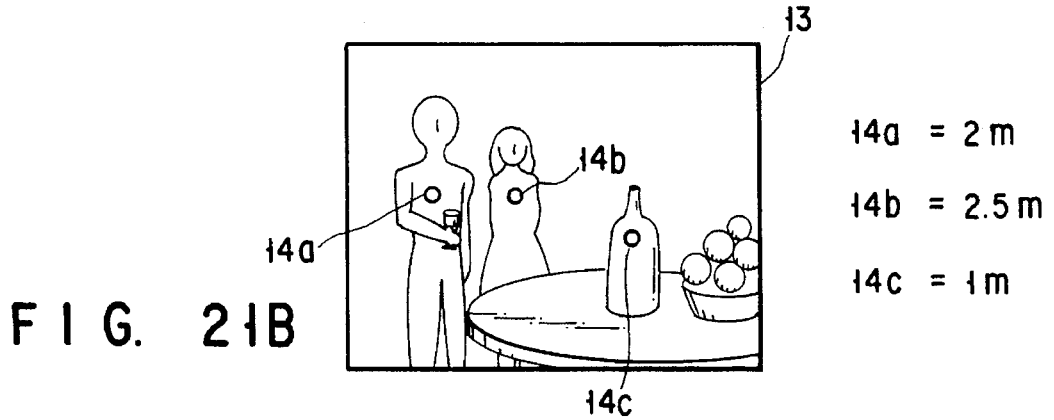
FIG. 21B is a view showing objects to be photographed in the operation of the eighth embodiment.

The eighth embodiment of the present invention will be described with reference to FIGS. 21A and 21B. In eighth embodiment, an arrangement capable of ranging three points is assumed.

In this embodiment, in steps S11 to S13, all the points are ranged. In step S25, the minimum distance is represented by $l_{min}$. If it is determined in step S35 that a ranging result lb at the central point is equal to the minimum distance $l_{min}$, the flow advances to step S31 to perform focusing in accordance with the ranging result lb. That is, the embodiment is based on the idea that when the nearest object is present at the central point, the object is considered as a main object.

In other cases (lb ≈$l_{min}$), the flow advances to step S49 to obtain a maximum object distance $l_{max}$ at the remotest point of the three points. In step S50, the difference between the maximum and minimum object distances $l_{max}$ and $l_{min}$ is compared with a predetermined distance $l_{COMP}$. If it is determined in step S50 that the difference between the maximum and minimum object distances $l_{max}$ and $l_{min}$ is 1 m or less, it is considered that the probability that the object at the central point is a main object is higher.

Consequently, if it is determined in step S50 that the difference between the maximum and minimum object distances $l_{max}$ and $Z_{min}$ is smaller than $l_{COMP}$, the flow shifts to step S31 to focus the lens on the central point. This operation is based on the idea that when objects gather at similar distances, a main object is present in the center of the frame. If the difference between the maximum and minimum object distances $l_{max}$ and $l_{min}$ is larger than $l_{COMP}$, the flow advances to step S36 to obtain a focal length f of the photographing lens. In step S37, one of the ranging results la and lc at the left and right points which is nearer to 50×f is selected, and focusing is performed in accordance with the selected ranging result. Note that in this case, focusing may be performed by selecting one of the ranging results la, lb, and lc at the three points including the central point which is nearest to 50×f. Therefore, with respect to the composition shown in FIG. 12B, the lens is focused not on a ranging point 14a but on a central ranging point 14b.

Figure 19A:
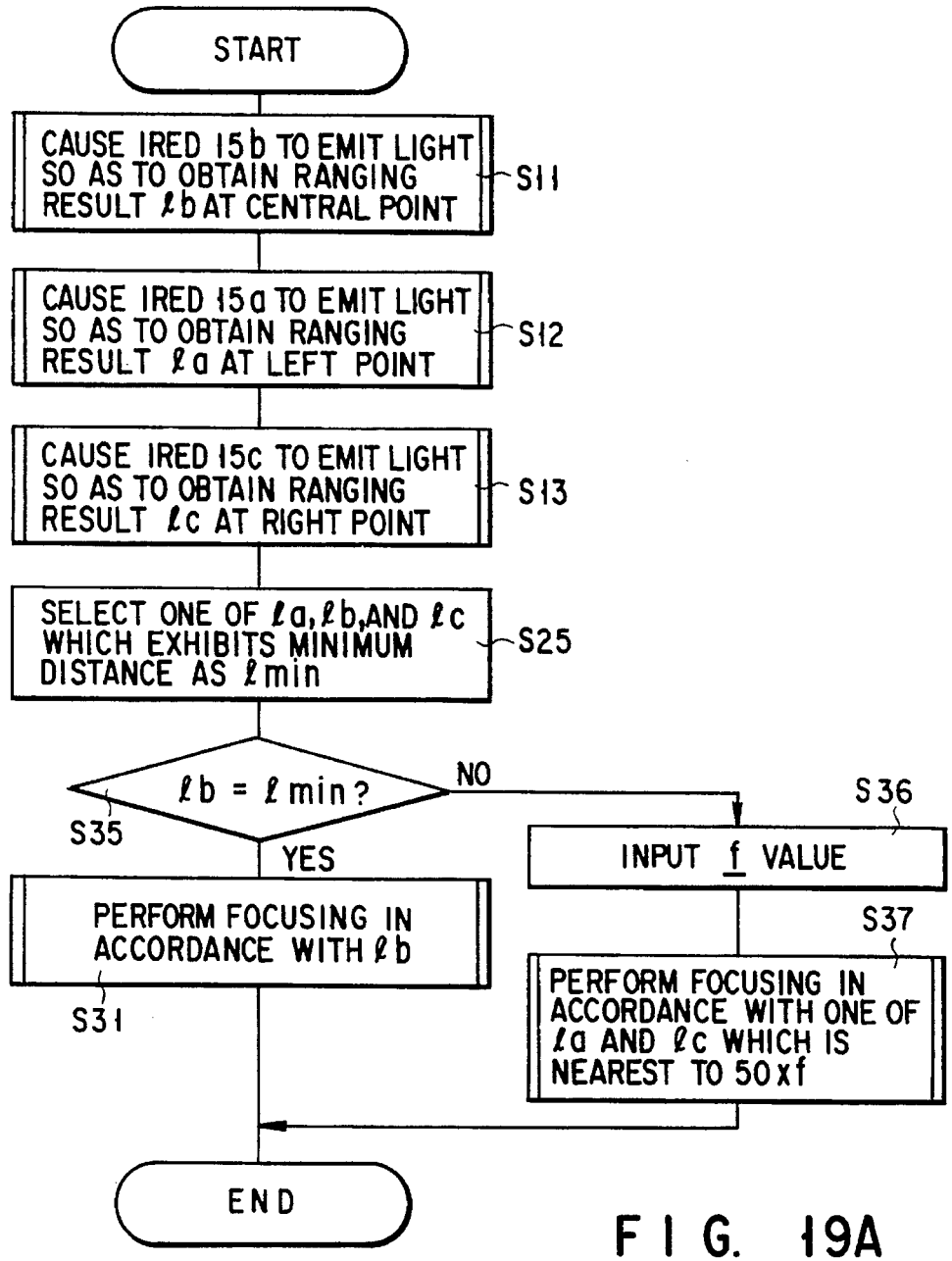
FIG. 19A is a flow chart for explaining an operation of the sixth embodiment of the present invention.
Figure 19B:
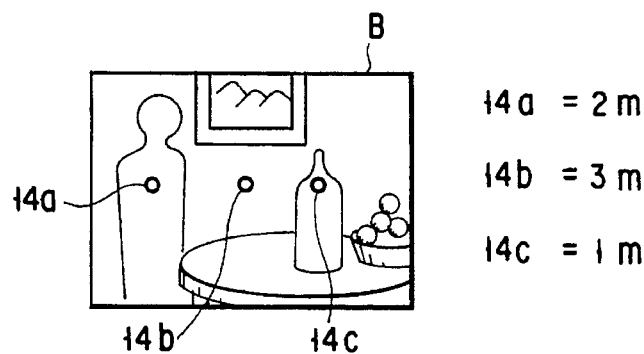
FIG. 19B is a view showing objects to be photographed in the operation of the sixth embodiment.
Figure 22:
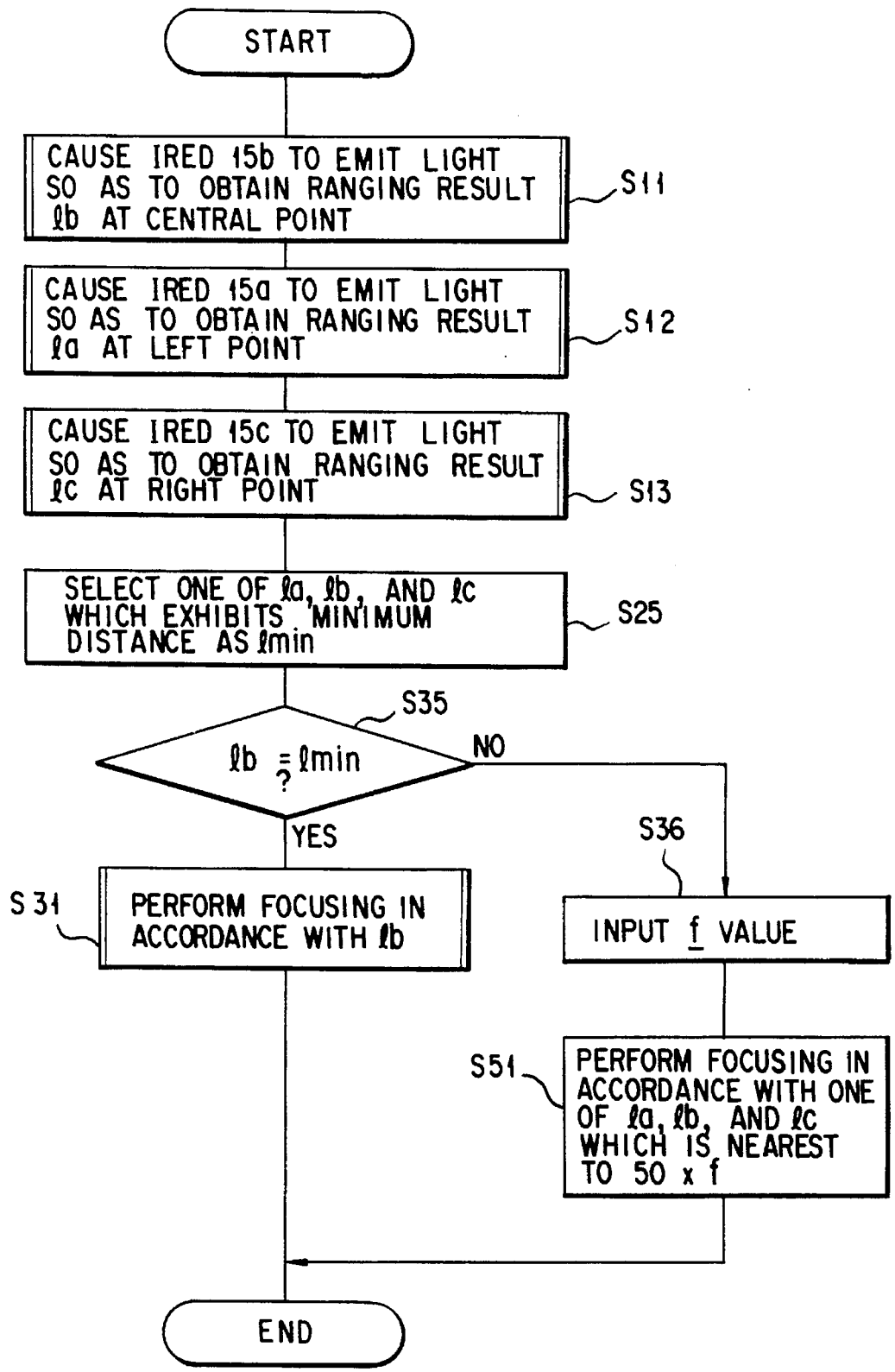
FIG. 22 is a flow chart for explaining an operation of the ninth embodiment of the present invention.

As the ninth embodiment, step S37 in the flow chart of FIG. 19A may be replaced with step S51 in FIG. 22.

That is, similar to the flow chart in FIG. 6, in steps S11 to S13, ranging at central, left, and right points are performed to obtain ranging results la, lb, and lc. In step S25, one of the ranging results la, lb, and lc which exhibits the minimum distance is represented by $l_{min}$.

It is checked in step S35 whether the ranging result lb at the central point is equal to the value $l_{min}$. If lb=$l_{min}$ is determined, focusing is performed in accordance with the ranging result lb in step S31. If lb≉$l_{min}$ is determined, the flow advances to step S36 to receive a focal length f of the photographing lens of the camera. In step S51, focusing is performed in accordance with one of the results la, lb, and lc which is nearest to 50×f.

This operation is based on the idea that when the nearest object is not present at the central point, one of the objects represented by the ranging results la, lb, and lc which is nearest to 50×f is a main object.

As described above, according to the first to ninth embodiments of the present invention, there is provided a practical autofocusing apparatus for a camera having a multiple ranging device, which has an arrangement designed to give much importance to the magnifications of objects to be photographed in many snaps so that the lens can be properly focused on main objects without adversely affecting autofocusing.

The tenth embodiment of the present invention will be described next with reference to the accompanying drawings.

Figure 23:
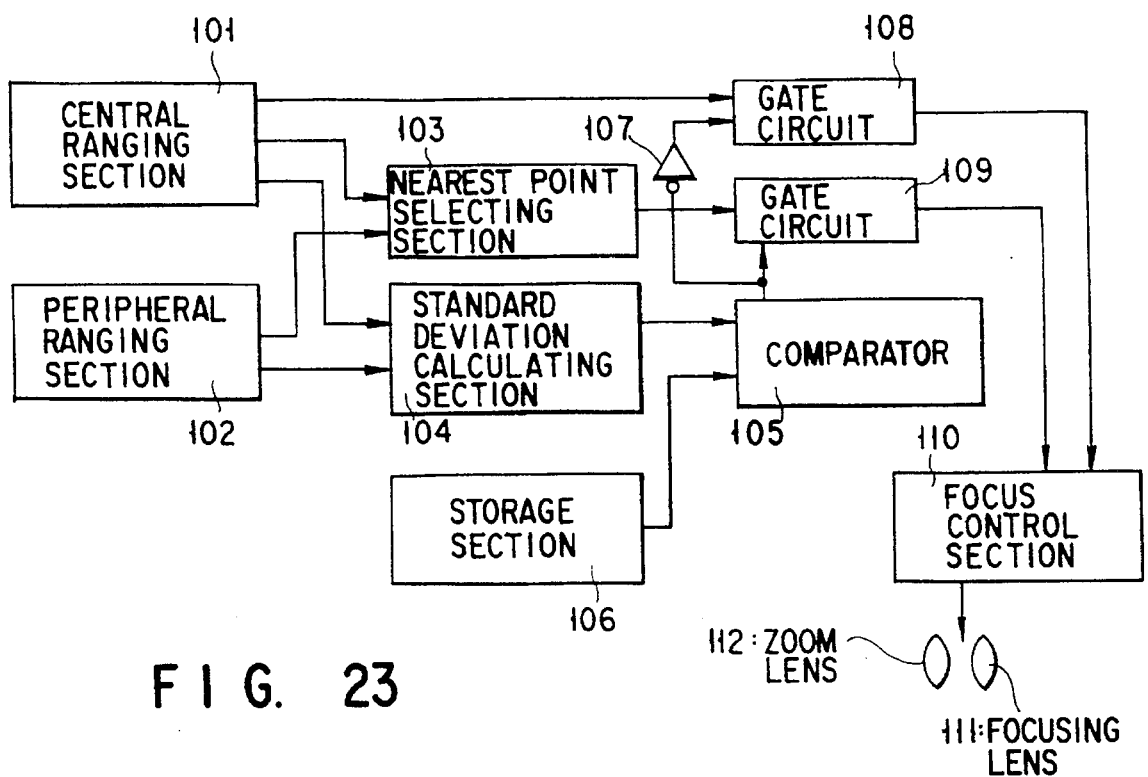
FIG. 23 is a block diagram showing the concept of the tenth embodiment of a camera having a multiple ranging device of the prevent invention.

FIG. 23 is a block diagram showing the concept of the tenth embodiment of a camera having a multiple ranging device of the present invention. Referring to FIG. 23, a central ranging section 101 is a means for ranging a substantially central portion of a photographic frame, and a peripheral ranging section 102 is a means for ranging substantially peripheral portions of the photographic frame. Outputs from the central ranging section 101 and the peripheral ranging section 102 are supplied to a nearest point selecting section 103 and a standard deviation calculating section 104.

A comparator 105 receives both a calculation result from the standard deviation calculating section 104 and a predetermined value stored in a storage section 106. A gate circuit 108 receives the output result from the central ranging section 101 and also receives a comparison result from the comparator 105 via an inverter 107. Meanwhile, a gate circuit 109 receives the comparison result from the comparator 105 and a selection result from the nearest point selecting section 103. A focus control section 110 controls a focusing lens 111 in accordance with output results from the gate circuits 108 and 109. Note that reference numeral 112 denotes a zoom lens.

In this arrangement, the substantially central portion of a photographic frame is ranged by the central ranging section 101, and the substantially peripheral portions of the photographic frame are ranged by the peripheral ranging section 102. Outputs from the central ranging section 101 and the peripheral ranging section 102 are supplied to the nearest point selecting section 103. The nearest point selecting section 103 then selects one of the outputs, from the respective ranging sections, which exhibits the minimum distance. The standard deviation calculating section 104 calculates variations in outputs from the central ranging section 101 and the peripheral ranging section 102.

This embodiment is designed to determine a distance output for focusing from output results from the respective ranging sections in accordance with an output result from the standard deviation calculating section 104. The comparator 105 compares the output result from the standard deviation calculating section 104 with the predetermined value stored in the storage section 106. The gate circuit 108 or 109 is selected by the comparator 105 through the inverter 107. Subsequently, the focus control section 110 receives a nearest point selection result based on the above-mentioned distance variation, and also receives the output result from the central ranging section 101 via the gate circuits 108 and 109. With this operation, the focus control section 110 controls the focusing lens 111.

The concept of determination of a focal length on the basis of the above-mentioned distance variation will be described below with reference to FIGS. 24A to 24C.

Figure 24A:
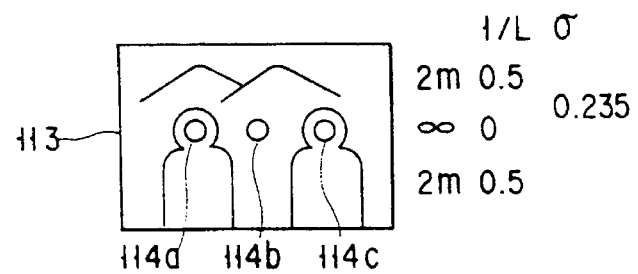
FIGS. 24A to 24C are views, each showing a composition of objects.

FIG. 24A shows a scene of an "object omission" which conventional multi-autofocus (AF) devices have tries to solve. That is, with a camera capable of ranging only a central point in a photographic frame 113, only the scenery between two human figures can be ranged, resulting in an out-of-focus photograph. The conventional devices have tried to solve such a problem. In this case, the values obtained at ranging points 114a, 114b, and 114c are 2 m, ∞ (infinity), and 2 m, respectively.

According to conventional devices, with respect to such objects, one of the three ranging points which exhibits the minimum distance is selected as a focal length (nearest point selection) to prevent an out-of-focus photograph.

Figure 24B:
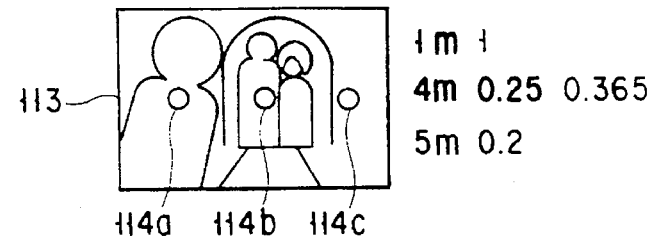

If, however, nearest point selection is always performed, the camera cannot be properly focused on main objects in a situation where human figures as main objects are located at a relatively remote place, while a human figure which the photographer has no intention of photographing comes in front of the main objects, as in a scene where a bride and groom make their entrance into a wedding hall at a wedding ceremony, as shown in FIG. 24B.

This embodiment is designed to properly focus the camera on the main objects in both the scenes shown in FIGS. 24A and 24B. In the embodiment, a focal length is determined in accordance with the magnitude of distance variation between the respective ranging points. More specifically, when an out-of-focus photograph of a scene like the one shown in FIG. 24B is to be prevented, an out-of-focus photograph will result from a scene like the one shown in FIG. 24c where a human figure is standing on the left side of the frame. In the embodiment, the difference between these scenes is determined on the basis of a variation in ranging result.

FIG. 24B shows an untidy scene where the respective ranging points 114a, 114b, and 114c exhibit various distances (1 m, 4 m, and 5 m). In such a scene, objects other than main objects tend to exist at the nearest point. For this reason, it is better to focus the camera on the central point in the photographic frame 113 than to simply perform nearest point selection. In addition, in such a situation, photographers tend to watch only a central portion of the photograph frame.

Figure 24C:
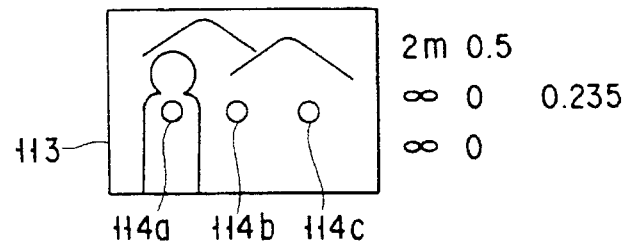

In contrast to this, for scenes where a distance variation is relatively small, as shown in FIGS. 24A and 24C, good photographs can be taken by using the conventional nearest point selection scheme.

FIGS. 25A to 25F show typical scenes. FIG. 26 is a table conceptually showing the correspondence between ranging points 114a, 114b, and 114c in each of the scenes shown in FIGS. 25A to 25F and "long distance", "middle distance", and "short distance".

In the embodiment, nearest point selection is performed with respect to the scenes shown in FIGS. 25A, 25B, and 25E where the distance variation is small, whereas the output ranging results obtained at the central points are selected for the scenes shown in FIGS. 25C, 25D, and 25F where the distance variations are large. However, for a photograph in which a human figure is located at a very near point in the photograph frame, as shown in FIG. 25C, the lens is focused on the scenery, even though the photograph has almost the same composition as that shown in FIG. 25B. In this case, the lens cannot be focused on the scenery by the nearest point selection scheme. Such a scene is photographed at a lower probability than the scene shown in FIG. 24B. Therefore, in the case of a scene like the one shown in FIG. 25C, even if the lens is focused on the scenery, a reduction in in-focus ratio is not caused.

When many people gather in front of the camera to be photographed, as shown in FIG. 25E, the nearest point selection scheme is employed. When a human figure behind a table is to be photographed, as shown in FIG. 25F, a central point selection scheme is employed. With this operation, photography can be performed without any failure.

A camera having a multiple ranging device according to the eleventh embodiment of the present invention may have the same arrangement as that of the first embodiment described above, and the description made with reference to FIGS. 3 to 5 will be applied to the eleventh embodiment.

A predetermined algorithm in the above-described tenth embodiment will be described next with reference to the flow chart of FIG. 27.

In steps S1', S2', and S3', a CPU 17 shown in FIG. 3 sequentially causes IREDs 15b, 15a, and 15c to emit light through drivers 16b, 16a, and 16c. In each step, the CPU 17 receives a value $ri_2$ in FIG. 3, and sequentially obtains object distances 1/Lb, 1/La, and 1/Lc on the basis of the values $ri_2$.

In this case, the reciprocals of distances are obtained for the following reason.

Figure 28:
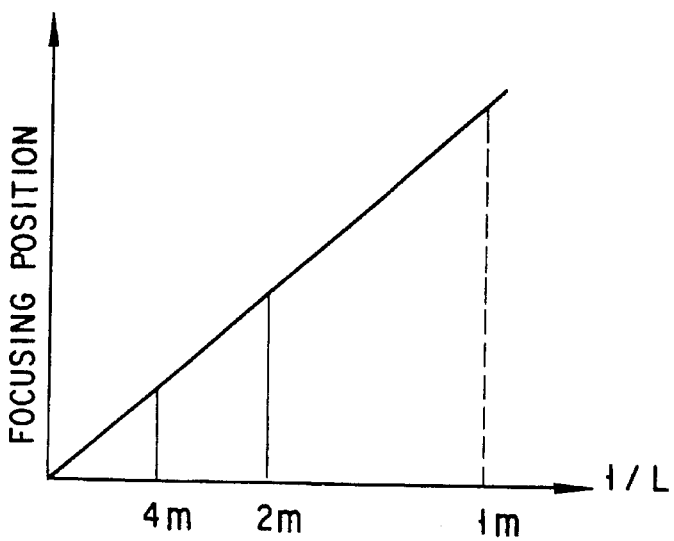
FIG. 28 is a graph showing the relationship between the reciprocal (l/L) of a distance and the focusing position of a photographic lens.

As shown in FIG. 28, the relationship between the reciprocal (1/L) of a distance and the focusing position of the photographing lens is almost linear. In step S4', variations in these reciprocals are calculated. By calculating the reciprocals of distances, a sensitive weighting operation can be performed with respect to near undesired objects.

In addition, since the output result of trigonometric ranging itself is theoretically output not in proportion to L but in proportion to 1/L, a variation can be calculated more simply by using the reciprocal of L as it is.

Note that a standard deviation e is used as an amount representing a variation. This value is calculated according to equation (9):

$$\sigma = \sqrt{\left(\frac{1}{La} - Av\right)^2 + \left(\frac{1}{Lb} - Av\right)^2 + \left(\frac{1}{Lc} - A\right)^{2/3}} \quad (9)$$

where Av is the average value of 1/La, i/Lb, and 1/Lc.

However, equation (9) need not be strictly used, because comparison between a variation and a predetermined value can be performed without using "3", the number of ranging points, as a divisor, or calculating the square root.

In step S5', determination is performed on the basis of this result. If the variation e is larger than a predetermined amount $\sigma_0$, the flow advances to step S6' to select the ranging result 1/Lb at the central point. If the variation is smaller than the amount $\sigma_0$, the flow advances to step S7' to select one of the ranging results 1/La, 1/Lb, and 1/Lc which exhibits the minimum distance.

In this case, the predetermined value $\sigma_0$ for comparison is determined with reference to FIGS. 24A to 24C. The value $\sigma$ in FIG. 24A is 0.235, provided that La, Lb, and Lc are 2 m, 2 m, and ∞, respectively. The value $\sigma$ in FIG. 24B is 0.365, provided that La, Lb, and Lc are 1 m, 4 m, and 5 m, respectively. If, therefore, the value $\sigma_0$ is set to be about 0.35, the nearest point is selected in the scene shown in FIG. 24A, and the central point is selected in the scene shown in FIG. 24B. The value e in FIG. 25C is 0.235, provided that La, Lb, and Lc are 2 m, ∞, and ∞, respectively. Therefore, the flow branches from step S5' to step S7' to use the nearest point selection scheme, thereby obtaining a photograph without an "object omission".

Figure 29:
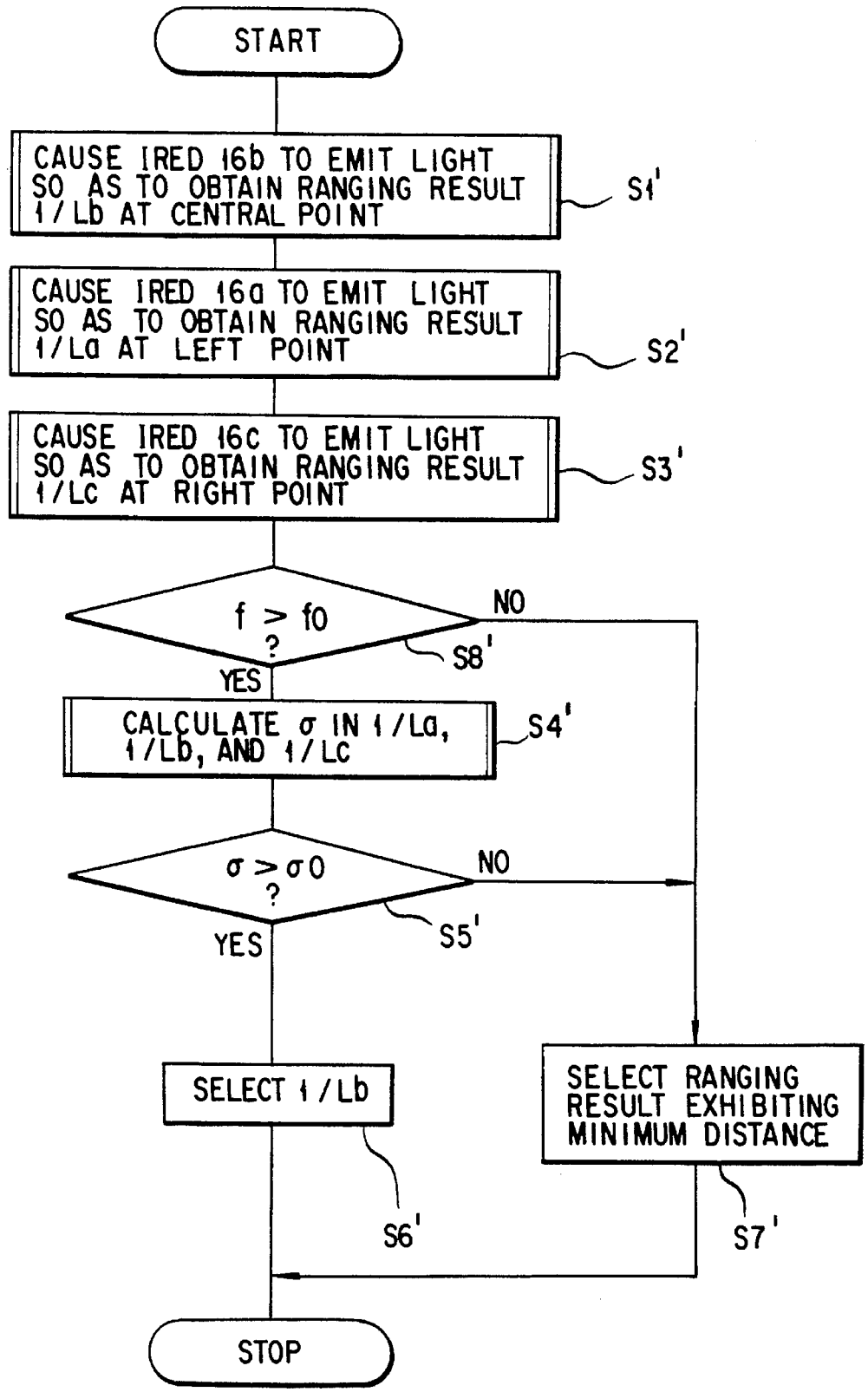
FIG. 29 is a flow chart for explaining an operation of the twelfth embodiment of the present invention.

FIG. 29 is a flow chart for explaining an operation of the twelfth embodiment of the present invention. In this embodiment, step S8' of giving additional consideration to the focal length of the photographing lens of the camera is inserted between steps S3' and S4' of the flow chart of FIG. 27 which shows the operation of the eleventh embodiment. More specifically, in step S8', data representing a zooming position is loaded from the zoom encoder 38 shown in FIG. 3 in each photographic operation, and the same selection method as that indicated in the flow chart of FIG. 27 is performed only when the focal length is set on the long-focus side.

Figure 30A:
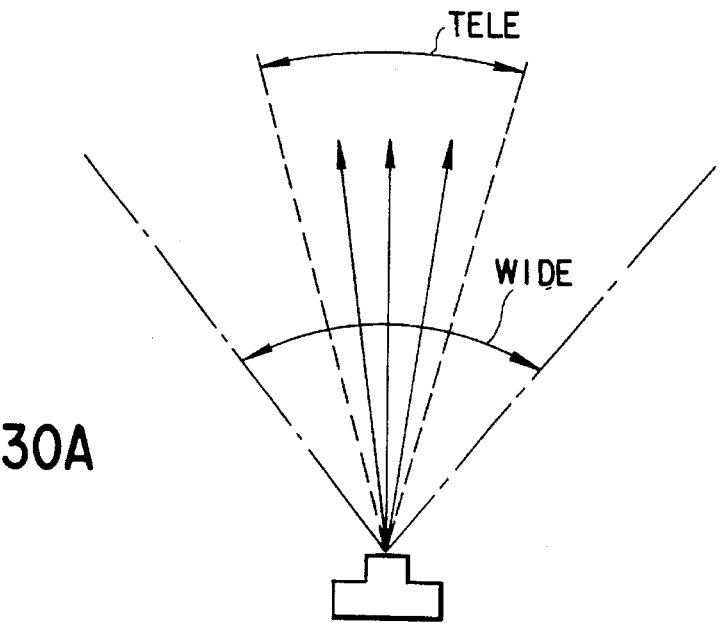
FIG. 30A is a view showing the field angle of the photographic lens of the camera.
Figure 30B:
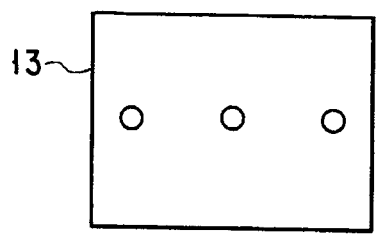
FIG. 30B is a view showing ranging positions in a photographic frame when the field angle is set on the telephoto side.
Figure 30C:
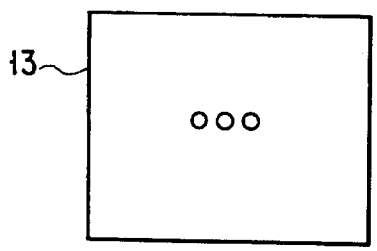
FIG. 30C is a view showing ranging positions in a photographic frame when the field angle is set on the wide-angle side.

When the focal length is set on the short-focus side, nearest point selection is simply performed. The reason for this operation will be clarified below with reference to FIGS. 30A to 30C. In a ranging device for ranging predetermined ranging points, when the field angle of the photographing lens of the camera changes between the telephoto side and the wide-angle side, as shown in FIG. 30A, the ranging positions in the photographic frame change, as shown in FIGS. 30B and 30C. In this case, on the short-focus side, the ranging points shift to a central portion of the photographic frame, as shown in FIG. 30C. As a result, the probability that undesired objects are ranged is decreased.

Figure 27:
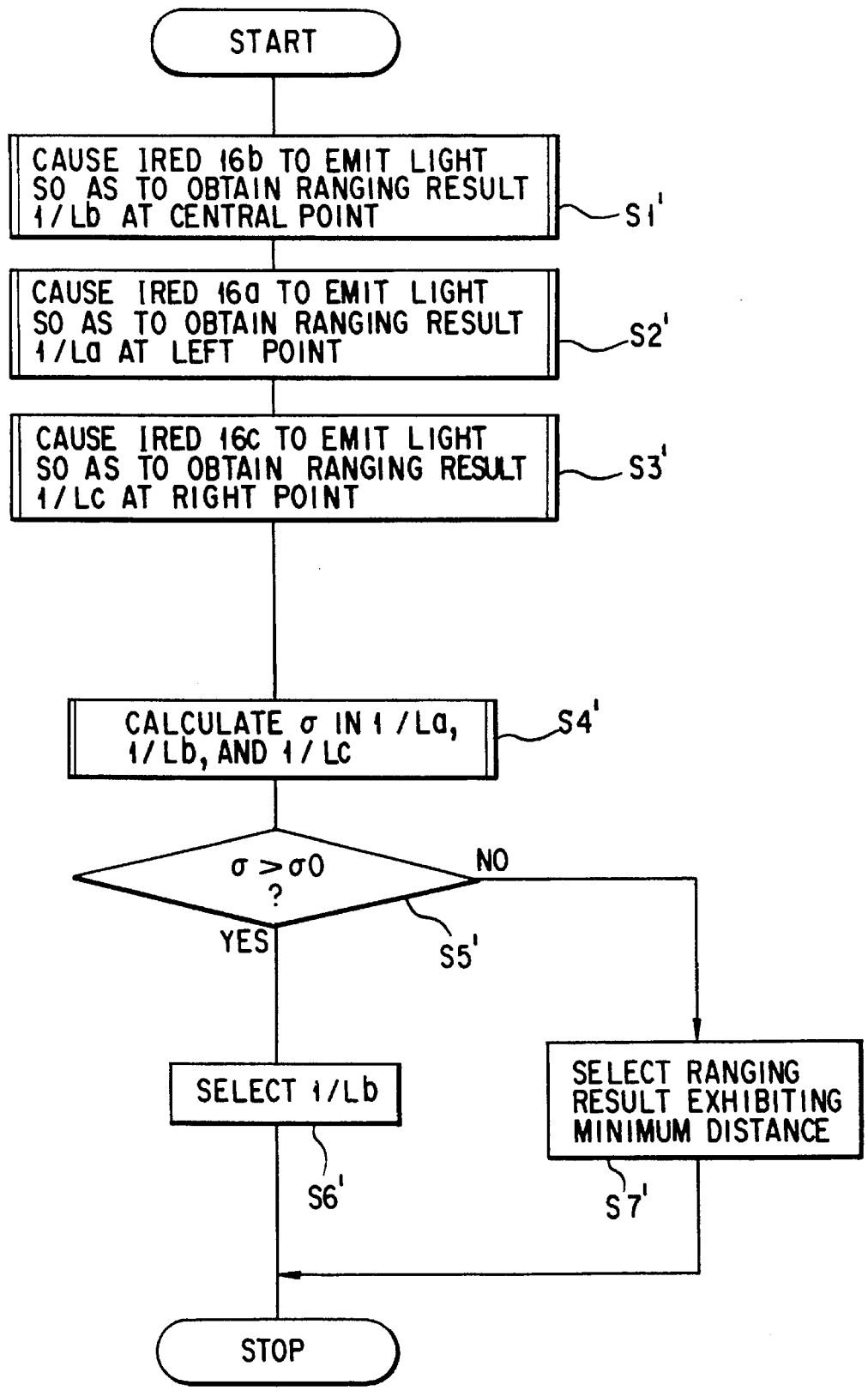
FIG. 27 is a flow chart for explaining an operation of the eleventh embodiment of the present invention.

Note that since the remaining steps in FIG. 29 are the same as those in the flow chart of FIG. 27 showing the operation of the eleventh embodiment, they are denoted by the same step numbers and a description thereof will be omitted.

FIG. 31 is a flow chart for explaining an operation of the thirteenth embodiment of the present invention. In this embodiment, step S6' in the flow chart of FIG. 29 showing the operation of the twelfth embodiment is replaced with step S9'.

As shown in FIG. 8, according to the relationship between the photographing magnification and the probability of photographs to be taken, it is apparent that the probability that main objects are photographed between f×1/50 and f×1/80 is high. Therefore, in step S9', focusing is performed with priority being given to an object located at such a distance.

That is, in the thirteenth embodiment, similar to the flow chart of FIG. 29, since it is considered only when the field angle of the photographing lens is small, the adverse effect of multi-AF occurs, determination of a variation is performed in step S5' only when the focal length of the photographing lens is large.

In the thirteenth embodiment, if it is determined in step S5' that the variation in object distance is large, the flow advances to step S6' to select one of the ranging results La, Lb, and Lc which exhibits the photographing magnification nearest to f×1/70, i.e., which exhibits the distance nearest to 70×f. If, for example, a 50-mm lens is used, one of the ranging results La, Lb, and Lc which exhibits the distance nearest to 50×70=3,500 mm=3.5 m may be selected, and focusing may be performed in accordance with the selected ranging result.

As has been described above, according to the tenth to thirteenth embodiments of the present invention, when an untidy scene where many objects are present, as in a party hall or in a train, is to be photographed, the lens is focused on a central portion of a photographic frame. Therefore, there is provided a practical autofocusing apparatus for a camera having a multiple ranging device, which can properly focus the camera on main objects by preventing the camera from being focused on undesired objects such as tables and walls, has an "object omission" preventing effect, and can reduce the adverse effect of autofocusing.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An autofocusing apparatus for a camera, comprising:
    a photographing lens for forming an object image on a film surface;
    a first ranging unit for measuring a distance to an object located at a substantially central portion of a photographic frame of said camera, and for outputting a first ranging result;
    a second ranging unit for measuring a distance to an object located at a peripheral portion of the photographic frame, and for outputting a second ranging result;
    a control unit for receiving the first and second ranging results obtained by said first and second ranging units and for determining a focusing position of said photographing lens, said control unit determining whether the first ranging result obtained by said first ranging unit is larger than a first predetermined distance which is relatively short, and, when said control unit determines that the first ranging result is larger than the first predetermined distance, said control unit selecting and outputting one of the first and second ranging results which is nearer to a second predetermined distance which is larger than said first predetermined distance, wherein said first and second ranging results indicate distance which are at least one of far from and near to said second predetermined distance; and
    a focus control unit for receiving the output from said control unit and for controlling said photographing lens on the basis of the output from said control unit.

2. An apparatus according to claim 1, wherein said control unit selects and outputs one of the first and second ranging results which exhibits a minimum distance, when said control unit determines that the first ranging result obtained by said first ranging unit is smaller than the first predetermined distance.

3. An apparatus according to claim 1, wherein:
    said photographing lens comprises a zoom lens;
    said camera includes a focal length detection unit for detecting a focal length of said zoom lens; and
    said control unit obtains the first predetermined distance on the basis of the focal length detected by said focal length detection unit, and performs the determination by using the first predetermined distance.

4. An apparatus according to claim 1, wherein:
    said photographing lens comprises a zoom lens;
    said camera includes a focal length detection unit for detecting a focal length of said zoom lens; and
    said control unit obtains the second predetermined distance on the basis of the focal length detected by said focal length detection unit, and performs the determination by using the second predetermined distance.

5. An apparatus according to claim 4, wherein said control unit obtains the second predetermined distance by multiplying the focal length of said zoom lens by a predetermined multiple.

6. An apparatus according to claim 4, wherein said control means detects whether said zoom lens has reached a predetermined position, obtains the second predetermined distance by performing a first arithmetic operation when said zoom lens has reached the predetermined position, and obtains the second predetermined distance by performing a second arithmetic operation when said zoom lens has not reached the predetermined position.

7. An apparatus according to claim 4, wherein said control unit obtains the second predetermined distance by squaring the focal length of said zoom lens.

8. An autofocusing apparatus for a camera, comprising:
    a photographing lens for forming an object image on a film surface;
    a ranging unit for measuring distances to objects corresponding to a plurality of points in a photographic frame of said camera, and for outputting a plurality of ranging results indicating distances which are at least one of far from and near to a first predetermined distance at which there is a high probability that a main object is present;
    a control unit for receiving the plurality of ranging results obtained by said ranging unit, and for determining a focusing position of said photographing lens, said control unit including means for selecting and outputting one of the plurality of ranging results which indicates a distance which is nearest to the first predetermined distance; and
    a focus control unit for receiving the output from said control unit and for controlling said photographing lens on the basis of the output from said control unit.

9. An apparatus according to claim 8, wherein:
    said control unit selects one of the plurality of ranging results which is nearest to the first predetermined distance only when the ranging result obtained at the object corresponding to a substantially central portion of the photographic frame is larger than a second predetermined distance; and
    said control unit selects one of the plurality of ranging results which exhibits a minimum distance when the ranging result obtained at the object corresponding to substantially the central portion is smaller than the second predetermined distance, wherein the second predetermined distance is set to be smaller than said first predetermined distance.

10. An apparatus according to claim 8, wherein:

said control unit selects one of the plurality of ranging results which is nearest to the first predetermined distance only when the ranging result exhibiting a minimum distance is larger than a second predetermined distance; and said control unit selects one of the plurality of ranging results which exhibits a minimum distance when the ranging result exhibiting the minimum distance is smaller than the second predetermined distance, wherein the second predetermined distance is set to be smaller than said first predetermined distance.

11. An apparatus according to claim 8, wherein said control unit selects one ranging result, which indicates a minimum distance, out of said plurality of ranging results outputted by said ranging unit, without selecting the ranging result indicating a distance nearest to the first predetermined distance, when the ranging result indicating the minimum distance is the ranging result obtained at the object corresponding to a substantially central portion of the photographic frame.

12. An apparatus according to claim 8, wherein said control unit selects the ranging result indicating a distance nearest to the first predetermined distance only when a difference between ranging results, of the plurality of ranging results, which respectively indicate minimum and maximum distances, is larger than a predetermined value.

13. An apparatus according to claim 8, wherein said control unit extracts one of the plurality of ranging results which indicates a minimum distance, and selects one of the plurality of ranging results which indicates a distance which is nearest to the first predetermined distance, only when the extracted ranging result does not coincide with the ranging result obtained at the object corresponding to a substantially central portion of the photographic frame.

14. An autofocusing camera, comprising:

ranging means for ranging a plurality of objects existing in a photographic frame, and for outputting a plurality of ranging values indicating distances which are at least one of far from and near to a predetermined distance at which there is a high probability that a main object is present;

selection means for selecting one of the plurality of ranging values obtained by said ranging means, said selection means comparing each of the plurality of ranging values with a predetermined value corresponding to the predetermined distance, and selecting one of the ranging values which is nearest to the predetermined value; and focus control means for performing focus control of a photographing lens on the basis of the ranging value selected by said selection means.

15. A camera according to claim 14, wherein the predetermined value is determined based on a photographing magnification and a focal distance of said photographing lens which corresponds to said predetermined distance at which there is a high probability that a main object is present.

16. A camera according to claim 14, wherein said selection means includes means for selecting one of the plurality of ranging values which indicates a minimum distance when a ranging value in a specific area of the photographic frame is smaller than another predetermined value different from the first-mentioned predetermined value.

17. A camera according to claim 14, wherein said selection means includes means for selecting a ranging value in a specific area of the photographic frame when the ranging value in the specific area is smaller than another predetermined value different from the first-mentioned predetermined value.

18. A camera according to claim 14, wherein said selection means includes:

calculation means for calculating a variation in inverses of distances to respective objects which are obtained from the ranging values; and means for selecting one of the plurality of ranging values which exhibits a minimum distance when the calculated variation is small.

19. An autofocusing camera comprising:

ranging means for ranging objects existing at central and peripheral portions of a photographic frame, and for outputting a plurality of ranging values;

first selection means for selecting one of the plurality of ranging values which exhibits a minimum distance;

second selection means for selecting the ranging value at the central portion from the plurality of ranging values;

control means for selectively operating one of said first and second selection means, said control means operating said second selection means when a variation in inverses of distances to respective objects which are obtained from the ranging values is large; and focus control means for executing focus control of a photographing lens on the basis of the ranging value selected by one of said first and second selection means.

20. An autofocusing apparatus for a camera, comprising:

a photographing lens for forming an object image on a film surface;

a ranging unit for measuring distances to objects corresponding to a plurality of points in a photographic frame of said camera, and for outputting a plurality of ranging results;

a control unit for receiving the plurality of ranging results obtained by said ranging unit and for determining a focusing position of said photographing lens, said control unit calculating a variation in inverses of distances to respective objects which are obtained from the ranging results, determining a selection criterion for selecting one of the plurality of ranging results in accordance with the calculated variation, and determining and outputting an object distance in accordance with the selection criterion; and a focus control unit for receiving the output from said control unit and for controlling said photographing lens.

21. An apparatus according to claim 20, wherein said control unit outputs a distance to the object corresponding to a substantially central portion of the photographic frame, as the object distance, when the variation is larger than a predetermined value, and outputs one of a plurality of distances to respective objects which are obtained from the ranging results and which exhibits a minimum distance, as the object distance, when the variation is smaller than the predetermined value.

22. An apparatus according to claim 20, wherein:

said photographing lens of said camera comprises a zoom lens;

said camera includes a focal length detection unit for detecting a focal length of said zoom lens; and said control unit compares the focal length detected by said focal length detection unit with a predetermined focal length, and selects an object distance on the basis of the variation only when the focal length is nearer to a long-focus side than the predetermined focal length.

23. An apparatus according to claim 20, wherein said control unit outputs one of the plurality of ranging results which is nearest to a predetermined distance determined in accordance with the focal length of the photographing lens, as the object distance, when a variation in ranging results is larger than the predetermined value.

24. An autofocusing apparatus for a camera having ranging means for ranging a plurality of points in a frame and for outputting a plurality of ranging outputs having values which correspond to respective distances which are at least one of far from and near to a predetermined distance at which there is a high probability that a main object is present, and determination means for determining a focusing position of a photographing lens in accordance with outputs from said ranging means, the autofocussing apparatus comprising:

first selection means for selecting a ranging output indicating a minimum distance from the plurality of ranging outputs from said ranging means;

second selection means for selecting a ranging output nearest to a predetermined value corresponding to said predetermined distance from the plurality of ranging outputs from said ranging means;

third selection means for selecting a ranging output obtained at a central portion of the frame from the plurality of ranging outputs from said ranging means; and control means for evaluating the ranging outputs from said ranging means, and for operating one of said first, second, and third selection means.

25. An apparatus according to claim 24, wherein said control means includes means for comparing one of the plurality of ranging outputs which exhibits a minimum distance with a predetermined value for determining whether a camera is in a state of a macro-region photography, and for operating one of said first, second, and third selection means in accordance with the comparison result.

26. An apparatus according to claim 24, wherein said control means includes means for comparing the ranging output obtained by said ranging means at the central portion of the frame with a predetermined value for determining that no object is present, and for operating one of said first, second, and third selection means in accordance with the comparison result.

27. An apparatus according to claim 24, wherein said control means includes means for comparing a difference between a ranging output of a maximum distance and a ranging output of a minimum distance, of the plurality of ranging outputs, with a predetermined distance difference, and for operating one of said first, second, and third selection means in accordance with the comparison result.

28. An apparatus according to claim 24, wherein said control means includes means for comparing a variation in the plurality of ranging outputs with a predetermined value, and operating one of said first, second, and third selection means in accordance with the comparison result.

29. An apparatus according to claim 24, wherein said control means includes means for operating said third selection means when the ranging output obtained by said ranging means at the central portion of the frame exhibits a minimum distance.

30. An apparatus according to claim 24, further including fourth selection means for selecting one of ranging outputs at a plurality of ranging points adjacent to the central portion of the frame which exhibits a minimum distance, and wherein said control means includes means for operating said fourth selection means when the ranging output obtained at the central portion of the frame does not exhibit a minimum distance.

31. A multiple point ranging device for setting a photographing device to perform macro-photography, the ranging device comprising:

ranging means for determining a range for at least three points within a photographic frame; and switching means for switching between (i) a first mode which permits an ordinary photographing distance to be used as a focal length by the photographing device, and (ii) a second mode in which a macro-photographing distance is selected as said focal length for the photographing device, said switching means switching from said first mode to said second mode when said ranging means determines that two out of said at least three points are in a short-distance region which is suitable for macro-photography.

32. An apparatus according to claim 31, wherein said ranging means includes control means for selecting a ranging result obtained at an object corresponding to substantially a central portion of the photographic frame, without selecting a ranging result nearest to a first predetermined distance, when the ranging result obtained at the object corresponding to substantially the central portion of the photographic frame is smaller than a predetermined longer distance at which no object is judged to be present at the substantially central portion of the photographic frame.

* * * * *

UNITED STATES PATENT AND TRADEMARK OFFICE
CERTIFICATE OF CORRECTION

PATENT NO. : 5,589,911
DATED     : December 31, 1996
INVENTOR(S) : Osamu NONAKA

It is certified that error appears in the above-indentified patent and that said Letters Patent is hereby corrected as shown below:

Title page, Item [56] References Cited,
           under U.S. PATENT DOCUMENTS, delete:

"5,283,894  2/1994  Deran.......395/600"; and

"5,448,727  9/1995  Annevelink...395/600"

Signed and Sealed this

Twenty-third Day of December, 1997

Attest:

BRUCE LEHMAN

*Attesting Officer*     Commissioner of Patents and Trademarks